United States Patent [19]
Mühlebach et al.

[11] Patent Number: 5,854,299
[45] Date of Patent: *Dec. 29, 1998

[54] PROCESS FOR THE POLYMERIZATION OF CYCLIC OLEFINS AND POLYMERIZABLE COMPOSITION

[75] Inventors: Andreas Mühlebach, Belfaux; Paul Bernhard, Marly; Andreas Hafner, Laupen; Thomas Karlen, Berne; Martin Andreas Ludi, Vechigen, all of Switzerland

[73] Assignee: Ciba Specialty Chemicals Corporation, Tarrytown, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 615,255

[22] PCT Filed: Aug. 31, 1994

[86] PCT No.: PCT/EP94/02879

§ 371 Date: Mar. 18, 1996

§ 102(e) Date: Mar. 18, 1996

[87] PCT Pub. No.: WO95/07310

PCT Pub. Date: Mar. 16, 1995

[30] Foreign Application Priority Data

Sep. 10, 1993 [CH] Switzerland ............ 2722/93
Jul. 1, 1994 [CH] Switzerland ............ 2116/94

[51] Int. Cl.⁶ ............... C08F 2/48; C08F 4/42; C08F 32/00; C08F 132/00
[52] U.S. Cl. ............... 522/66; 522/29; 522/65; 522/170; 522/179; 522/184; 522/185; 522/188; 526/171; 526/252; 526/268; 526/280
[58] Field of Search ............... 522/65, 66, 29, 522/160, 170, 179, 184, 185, 188; 526/171, 252, 268, 280

[56] References Cited

U.S. PATENT DOCUMENTS

| | | | |
|---|---|---|---|
| 4,060,468 | 11/1977 | Castner | 204/158 |
| 5,089,536 | 2/1992 | Palzzotto | 522/29 |

FOREIGN PATENT DOCUMENTS

9313171 7/1993 WIPO .

OTHER PUBLICATIONS

"Ullmann's Encyclopedia of Industrial Chemistry", 5ᵗʰ Edition, vol. B4, pp. 12–14.
M. A. Bennet et al., J.C.S. Dalten Trans., 233–241 (1974).
M.A. Bennet et al. J. Organomet. Chem. 175:87–93 (1979).
W. Feast et al. J. Mol. Catal. 65:63–72 (1991).
W.R. Gilkerson et al. J. Am. Chem. Soc. 101:4096–411 (1979).
S. J. Landen et al. J. Am.Chem Soc. vol. 107:6739–6740 (1985).
S. Luo et al. J. Am. Chem. Soc. 114:8515–8520 (1992).
C. Tanielan et al. Tetrahedran letters No. 52:pp. 4589–4592 (1977).
H.H. Thoi et al. J.Mel.Catal. 15:245–270 (1982).
Ivin, K.S, Oletin Methathesis, Academic Press, pp. 1–13, London (1983).

*Primary Examiner*—Susan W. Berman
*Attorney, Agent, or Firm*—Luther A. R. Hall; Richard A. Morgan; Victoria M. Malia

[57] ABSTRACT

Process for the polymerization of cyclic olefins by photochemical ring-opening metathesis polymerization by irradiation, using catalytic amounts of a heat-stable ruthenium or osmium catalyst which has at least one photolabile ligand, the other coordination sites being occupied by non-photolabile ligands.

44 Claims, No Drawings

PROCESS FOR THE POLYMERIZATION OF CYCLIC OLEFINS AND POLYMERIZABLE COMPOSITION

The present invention relates to a process for the polymerization of cyclic olefins by photochemical ring-opening metathesis polymerization using catalytic amounts of a transition metal catalyst, and to compositions comprising these olefins together with a catalytic amount of this catalyst.

Thermally induced ring-opening metathesis polymerization using catalytic amounts of metal catalysts has already been known for a relatively long time and has been described in several instances in the literature (cf., for example, K. J. Ivin, Olefin Metathesis, Academic Press, London, 1983). Such thermal polymers are prepared industrially and are commercially obtainable.

On the other hand, only little has been disclosed on photochemically induced ring-opening metathesis polymerization, and as yet there have been no commercial applications. It is furthermore known from this publication that olefin metathesis reactions can be initiated photochemically by $WCl_6$ catalysts. However, this type of catalyst is extremely sensitive to oxygen and moisture, which makes its storage and use considerably more difficult. Furthermore, these catalysts can be employed only within a relatively narrow temperature range, since they tend to decompose at elevated temperature.

It is known from U.S. Pat. No. 4,060,468 to carry out an olefin metathesis polymerization by introducing a two-component mixture of a metal salt chosen from the group consisting of tungsten, molybdenum, rhenium and tantalum salts and a substituted phenol or benzyl alcohol as cocatalysts to a reaction vessel with the monomeric olefin, and then irradiating the entire reaction mixture with UV light. Olefins which are mentioned are only cyclic and acyclic hydrocarbons without functional groups or substituents. Separate storage of the catalyst components and the process step of mixing the catalyst components directly before the actual reaction render the known process industrially expensive and cumbersome.

C. Tanielan et al. describe, in Tetrahedron Letters No. 52, pages 4589 to 4592 (1977), the catalyst system $W(CO)_6/CCl_4$, which, after irradiation with UV light, can be employed for metathesis polymerization of cyclopentene and norbornene. Metal carbonyls are volatile and toxic, so that their use requires expensive safety precautions for physiological reasons.

Furthermore, a free radical addition reaction to form monomeric 1-chloro-2-trichloromethyl-cycloolefins is observed as a competing reaction.

It is known from H. H. Thoi et al., Journal of Molecular Catalysis, 15 (1982), pages 245 to 270 that a tungsten pentacarbonyl-carbene complex of the formula

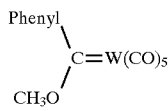

is a thermal catalyst for ring-opening metathesis polymerization of dimethylnorbornene, and, together with phenylacetylene as a cocatalyst, is also a photocatalyst system for the same polymerization. This catalyst system has the serious disadvantage that it has only a low storage stability as the ready-to-use formulation, the carbonyl compound is physiologically unacceptable, and the tolerance towards functional groups in cycloolefins is too low.

The known photochemically activatable catalysts thus always require a cocatalyst, which means that the quality of the polymers prepared can vary greatly due to the chosen nature and sequence of the reagents.

Polymers can be prepared from cyclic olefins by photochemical ring-opening metathesis polymerization by the known processes only with high expenditure and in an economically unsatisfactory manner. The lack of storage stability, which allows mixing of the components only directly before the preparation, the lack of tolerance towards functionalized cyclic olefins and the need to use two components as the catalyst system have been found to be particular disadvantages. There is therefore a need to provide a process, which is improved from the industrial, economic and ecological aspect and is generally usable, for the preparation of polymers from cyclic olefins by photochemical ring-opening metathesis polymerization.

It has been found that compositions of cycloolefins and a one-component catalyst can be polymerized photochemically if the composition comprises a thermally stable ruthenium or osmium compound having at least one photolabile ligand bonded to a metal atom. Surprisingly, these thermally stable compounds have proved to be active catalysts for photo-induced-ring-opening metathesis polymerization, the storage stability of mixtures of cycloolefins and the ruthenium or osmium compounds being retained, in spite of the photochemical reactivity.

It has furthermore been found, surprisingly, that the catalysts mentioned already actively catalyse the photopolymerization after a short irradiation, if appropriate in a solvent, or act as thermal catalysts after the irradiation, if appropriate in a solvent and/or in the presence of cycloolefins, so that photochemical and thermal polymerization can be used in combination.

The present invention relates to a process for the photocatalytic polymerization of a cyclic olefin or at least two different cyclic olefins in the presence of a metal compound as catalyst, which comprises carrying out a photochemical ring-opening metathesis polymerization from the UV range via the visible range into the near IR range in, the presence of a catalytic amount of at least one heat-stable ruthenium or osmium compound which has at least one photolabile ligand bonded to a metal atom, the remaining coordination sites being occupied by non-photolabile ligands.

The cyclic olefins can be mono- or polycyclic ring systems, for example having 2 to 4 rings, which are unsubstituted or substituted and can contain heteroatoms, for example O, S, N or Si, in one or more rings and/or fused aromatic or heteroaromatic rings, for example o-phenylene, o-naphthylene, o-pyridylene or o-pyrimidinylene. The cyclic rings can contain 3 to 16, preferably 3 to 12, and particularly preferably 3 to 8, ring members. The cyclic olefins can contain further non-aromatic double bonds, depending on the ring size, preferably 2 to 4 such additional double bonds. The substituents on the ring are those which are inert, i.e. which do not impair the chemical stability and heat stability of the ruthenium or osmium compounds. Heat stability in the context of the invention means that the photocatalytically active ruthenium or osmium compounds do not form active species for the ring-opening metathesis polymerization when heated. For example, it has been found that after these catalysts are heated at 110° C. for 24 hours with exclusion of air, no such active species are detectable. The catalyst can initiate no ring-opening metathesis polymerization, for example, at room temperature to slightly elevated temperature, for example +40° C., in the course of weeks to months with exclusion of light, and during this period less than 0.2% by weight of monomer is reacted. The heat stability can be determined, for example, by storing an ethanolic solution containing 20% by weight of monomer and 0.33% by weight of ruthenium or osmium catalyst in the dark at 50° C. for 96 hours, any amount of polymer formed (detectable by clouding) being not more than 0.2, and preferably not more than 0.1% by weight.

In a preferred embodiment of the process according to the invention, the cycloolefins are those of the fomula I

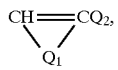 (I)

in which

Q$_1$ is a radical having at least one carbon atom which, together with the —CH═CQ$_2$- group, forms an at least 3-membered alicyclic ring which can contain one or more heteroatoms chosen from the group consisting of silicon, phosphorus, oxygen, nitrogen or sulfur, and which is unsubstituted or substituted by halogen, ═O, —CN, —NO$_2$, R$_1$R$_2$R$_3$Si—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_{20}$alkyl, C$_1$–C$_{20}$hydroxyalkyl C$_1$–C$_{20}$haloalkyl, C$_1$–C$_6$cyanoalkyl, C$_3$–C$_8$cycloalkyl, C$_6$–C$_{16}$aryl, C$_7$–C$_{16}$aralkyl, C$_3$–C$_6$heterocycloalkyl, C$_3$–C$_{16}$heteroaryl, C$_4$–C$_{16}$heteroaralkyl or R$_4$—X—; or in which two adjacent C atoms are substituted by —CO—O—CO— or —CO—NR$_5$—CO—; or in which an aromatic or heteroaromatic ring, which is unsubstituted or substituted by halogen, —CN, —NO$_2$, R$_6$R$_7$R$_8$Si—(O)$_u$—, —COOM, —SO$_3$M, —PO$_3$M, —COO(M$_1$)$_{1/2}$, —SO$_3$(M)$_{1/2}$, —PO$_3$(M$_1$)$_{1/2}$, C$_1$–C$_{20}$alkyl, C$_1$–C$_{20}$haloalkyl, C$_1$–C$_{20}$hydroxyalkyl, C$_1$–C$_6$cyanoalkyl, C$_3$–C$_8$cycloalkyl, C$_6$–C$_{16}$aryl, C$_7$–C$_{16}$aralkyl, C$_3$–C$_6$heterocycloalkyl, C$_3$–C$_{16}$heteroaryl, C$_4$–C$_{16}$heteroaralkyl or R$_{13}$—X$_1$—, is fused onto adjacent carbon atoms of the alicyclic ring;

X and X$_1$ independently of one another are —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—;

R$_1$, R$_2$ and R$_3$ independently of one another are C$_1$–C$_{12}$alkyl, C$_1$–C$_{12}$perfluoroalkyl, phenyl or benzyl;

R$_4$ and R$_{13}$ independently of one another are C$_1$–C$_{20}$alkyl, C$_1$–C$_{20}$haloalkyl, C$_1$–C$_{20}$hydroxyalkyl, C$_3$–C$_8$cycloalkyl, C$_6$–C$_{16}$aryl or C$_7$–C$_{16}$aralkyl;

R$_5$ and R$_{10}$ independently of one another are hydrogen, C$_1$–C$_{12}$alkyl, phenyl or benzyl, the alkyl groups in turn being unsubstituted or substituted by C$_1$–C$_{12}$alkoxy or C$_3$–C$_8$cycloalkyl;

R$_6$, R$_7$ and R$_8$ independently of one another are C$_1$–C$_{12}$alkyl, C$_1$–C$_{12}$perfluoroalkyl, phenyl or benzyl;

M is an alkali metal and

M$_1$ is an alkaline earth metal; and u is 0 or 1;

and in which the alicyclic ring formed with Q$_1$ can contain further non-aromatic double bonds;

Q$_2$ is hydrogen, C$_1$–C$_{20}$alkyl, C$_1$–C$_{20}$haloalkyl, C$_1$–C$_{12}$alkoxy, halogen, —CN or R$_{11}$—X$_2$—;

R$_{11}$ is C$_1$–C$_{20}$alkyl, C$_1$–C$_{20}$haloalkyl, C$_1$–C$_{20}$hydroxyalkyl, C$_3$–C$_8$cycloalkyl, C$_6$–C$_{16}$aryl or C$_7$–C$_{16}$aralkyl;

X$_2$ is —C(O)—O— or —C(O)—NR$_{12}$—;

R$_{12}$ is hydrogen, C$_1$–C$_{12}$alkyl, phenyl or benzyl;

and in which the abovementioned cycloalkyl, heterocycloalkyl, aryl, heteroaryl, aralkyl and heteroaralkyl groups are unsubstituted or substituted by C$_1$–C$_{12}$alkyl, C$_1$–C$_{12}$alkoxy, —NO$_2$, —CN or halogen, and in which the heteroatoms of the abovementioned heterocycloalkyl, heteroaryl and heteroaralkyl groups are chosen from the group consisting of —O—, —S—, —NR$_9$— and —N═; and R$_9$ is hydrogen, C$_1$–C$_{12}$alkyl, phenyl or benzyl.

Other olefins which are capable of metathesis can be co-used in the process according to the invention, for example in amounts of up to 40 mol %, preferably 0.01 to 30 mol %, and particularly preferably 0.1 to 20 mol %, based on the total amount of cycloolefins and olefins present.

Olefins which are capable of metathesis and which the mixtures of the formula I which can be polymerized according to the invention can additionally comprise can be used, for example, for crosslinking or for regulation of the molecular weight. Examples of suitable olefins are cyclooctadiene or -triene or compounds having the following structures:

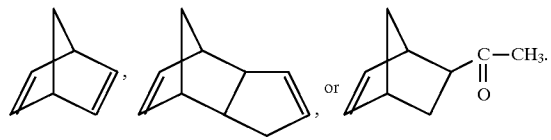

Furthermore, compounds such as 2-butene-1,4-diol, as described in Feast, W. J., Harrison, B, J. Mol. Catal. 65, 63 (1991), or 1-hexene (rearrangements) are also suitable.

If an asymmetric centre is present in the compounds of the formula I, this means that the compounds can occur in optically isomeric forms. Some compounds of the formula I may occur in tautomeric forms (for example keto-enol tautomerism). If an aliphatic C═C double bond is present, geometric isomerism (E-form and Z-form) can also occur. In addition, exo-endo configurations are also possible. Formula I thus comprises all possible stereoisomers which exist in the form of enantiomers, tautomers, diastereomers, E/Z isomers or mixtures thereof.

In the definition of the substituents, the alkyl, alkenyl and alkynyl groups can be straight-chain or branched. The same also applies to the or each alkyl moiety of alkoxy, alkylthio, alkoxycarbonyl and other alkyl-containing groups. These alkyl groups preferably contain 1 to 12, more preferably 1 to 8, and particularly preferably 1 to 4 C atoms. These alkenyl and alkynyl groups preferably contain 2 to 12, more preferably 2 to 8, and particularly preferably 2 to 4 C atoms.

Alkyl includes, for example, methyl, ethyl, isopropyl, n-propyl, n-butyl, isobutyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Hydroxyalkyl includes, for example, hydroxymethyl, hydroxyethyl, 1-hydroxyisopropyl, 1-hydroxy-n-propyl, 2-hydroxy-n-butyl, 1-hydroxy-iso-butyl, 1-hydroxy-sec-butyl, 1-hydroxy-tert-butyl and the hydroxy forms of the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Haloalkyl includes, for example, fluoromethyl, difluoromethyl, trifluoromethyl, chloromethyl, dichloromethyl, trichloromethyl, 2,2,2-trifluoroethyl, 2-fluoroethyl, 2-chloroethyl, 2,2,2-trichloroethyl and halogenated, in particular fluorinated or chlorinated, alkanes, such as, for example, the isopropyl, n-propyl, n-butyl, iso-butyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Alkenyl includes, for example, propenyl, isopropenyl, 2-butenyl, 3-butenyl, isobutenyl, n-penta-2,4-dienyl, 3-methyl-but-2-enyl, n-oct-2-enyl, n-dodec-2-enyl, iso-dodecenyl, n-octadec- 2-enyl and n-octadec-4-enyl.

Cycloalkyl is preferably $C_5$–$C_8$cycloalkyl, in particular $C_5$- or $C_6$cycloalkyl. Some examples are cyclopropyl, dimethylcyclopropyl, cyclobutyl, cyclopentyl, methylcyclopentyl, cyclohexyl, cycloheptyl and cyclooctyl.

Cyanoalkyl includes, for example, cyanomethyl (methylnitrile), cyanoethyl (ethylnitrile), 1-cyanoisopropyl, 1-cyano-n-propyl, 2-cyano-n-butyl, 1-cyano-iso-butyl, 1-cyano-sec-butyl, 1-cyano-tert-butyl and the various isomeric cyanopentyl and -hexyl radicals.

Aralkyl preferably contains 7 to 12 C atoms, and particularly preferably 7 to 10 C atoms. It can be, for example, benzyl, phenethyl, 3-phenylpropyl, α-methylbenzyl, phenbutyl and α,α-dimethylbenzyl.

Aryl preferably contains 6 to 10 C atoms. It can be, for example, phenyl, pentalene, indene, naphthalene, azulene and anthracene.

Heteroaryl preferably contains 4 or 5 C atoms and one or two heteroatoms from the group consisting of O, S and N. It can be, for example, pyrrole, furan, thiophene, oxazole, thioazole, pyridine, pyrazine, pyrimidine, pyridazine, indole, purine and quinoline.

Heterocycloalkyl preferably contains 4 or 5 C atoms and one or two heteroatoms from the group consisting of O, S and N. It can be, for example, oxirane, azirine, 1,2-oxathiolane, pyrazoline, pyrrolidine, piperidine, piperazine, morpholine, tetrahydrofuran and tetrahydrothiophene.

Alkoxy is, for example, methoxy, ethoxy, propyloxy, i-propyloxy, n-butyloxy, i-butyloxy, sec-butyloxy and t-butyloxy.

Alkali metal in the context of the present invention is to be understood as meaning lithium, sodium, potassium, rubidium and caesium, in particular lithium, sodium and potassium.

Alkaline earth metal in the context of the present invention is to be understood as meaning beryllium, magnesium, calcium, strontium and barium, in particular magnesium and calcium.

In the above definitions, halogen is to be understood as meaning fluorine, chlorine, bromine and iodine, preferably fluorine, chlorine and bromine.

Particularly suitable compounds of the formula I for the process according to the invention are those in which $Q_2$ is hydrogen.

Compounds of the formula I which are furthermore preferred for the polymerization are those in which the alicyclic ring which $Q_1$ forms together with the —CH═$CQ_2$- group has 3 to 16, more preferably 3 to 12, and particularly preferably 3 to 8 ring atoms, it being possible for the ring system to be a monocyclic, bicyclic, tricyclic or tetracyclic ring system.

The process according to the invention can be carried out particularly advantageously with those compounds of the formula I in which $Q_1$ is a radical having at least one carbon atom which, together with the —CH═$CQ_2$- group, forms a 3- to 20-membered alicyclic ring which can contain one or more heteroatoms chosen from the group consisting of silicon, oxygen, nitrogen and sulfur, and which is unsubstituted or substituted by halogen, ═O, —CN, —$NO_2$, $R_1R_2R_3Si$—(O)$_u$—, —COOM, —$SO_3$M, —$PO_3$M, —COO(M)$_{1/2}$, —$SO_3(M_1)_{1/2}$, —$PO_3(M_1)_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_4$—X—; or in which two adjacent C atoms in this radical Q, are substituted by —CO—O—CO— or —CO—$NR_5$—CO—; or in which an aromatic or heteroaromatic ring which is unsubstituted or substituted by halogen, —CN, —$NO_2$, $R_6R_7R_8Si$—, —COOM, —$SO_3$M, —$PO_3$M, —COO(M)$_{1/2}$, —$SO_3(M_1)_{1/2}$, —$PO_3(M_1)_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_{13}$—$X_1$— can be fused onto adjacent carbon atoms;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—; and $R_1$, $R_2$ and $R_3$ independently of one another are $C_1$–$C_6$alkyl, $C_1$–$C_6$perfluoroalkyl, phenyl or benzyl;

M is an alkali metal and $M_1$ is an alkaline earth metal;

$R_4$ and $R_{13}$ independently of one another are $C_1$–$C_{12}$alkyl, $C_1$–$C_{12}$haloalkyl, $C_1$–$C_{12}$hydroxyalkyl, $C_3$–$C_8$cycloalkyl, $C_6$–$C_{12}$aryl or $C_7$–$C_{12}$aralkyl;

$R_5$ and $R_{10}$ independently of one another are hydrogen, $C_1$–$C_6$alkyl, phenyl or benzyl, the alkyl groups in turn being unsubstituted or substituted by $C_1$–$C_6$alkoxy or $C_3$–$C_6$cycloalkyl;

$R_6$, $R_7$ and $R_8$ independently of one another are $C_1$–$C_6$alkyl, $C_1$–$C_6$perfluoroalkyl, phenyl or benzyl;

u is 0 or 1;

and in which the alicyclic ring formed with Q, can contain further non-aromatic double bonds;

$Q_2$ is hydrogen, $C_1$–$C_{12}$alkyl, $C_1$–$C_{12}$haloalkyl, $C_1$–$C_6$alkoxy, halogen, —CN or $R_{11}$—$X_2$—;

$R_{11}$ is $C_1$–$C_{12}$alkyl, $C_1$–$C_{12}$halogalkyl, $C_1$–$C_{12}$hydroxyalkyl, $C_3$–$C_6$cycloalkyl, $C_6$–$C_{12}$aryl or $C_7$–$C_{12}$aralkyl;

$X_2$ is —C(O)—O— or —C(O)—$NR_{12}$—; and $R_{12}$ is hydrogen, $C_1$–$C_6$alkyl, phenyl or benzyl;

and in which the cycloalkyl, heterocycloalkyl, aryl, heteroaryl, aralkyl and heteroaralkyl groups are unsubstituted or substituted by $C_1$–$C_6$alkyl, $C_1$–$C_6$alkoxy, —$NO_2$, —CN or halogen, and in which the heteroatoms of the heterocycloalkyl, heteroaryl and heteroaralkyl groups are chosen from the group consisting of —O—, —S—, —$NR_9$— and —N═; and $R_9$ is hydrogen, $C_1$–$C_6$alkyl, phenyl or benzyl.

From this group, preferred compounds of the formula I are those in which $Q_1$ is a radical having at least one carbon atom which, together with the —CH═$CQ_2$- group, forms a 3- to 10-membered alicyclic ring which can contain a heteroatom chosen from the group consisting of silicon, oxygen, nitrogen and sulfur and which is unsubstituted or substituted by halogen, —CN, —$NO_2$, $R_1R_2R_3Si$—, —COOM, —$SO_3$M, —$PO_3$M, —COO(M)$_{1/2}$, —$SO_3(M_1)_{1/2}$, —$PO_3(M_1)_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_4$—X—; or in which an aromatic or heteroaromatic ring which is unsubstituted or substituted by halogen, —CN, —NO$_2$, R$_6$R$_7$R$_8$Si—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$-C$_6$alkyl, C$_1$-C$_6$haloalkyl, C$_1$-C$_6$hydroxyalkyl, C$_1$-C$_4$cyanoalkyl, C$_3$-C$_6$cycloalkyl, phenyl, benzyl or R$_{13}$—X$_1$— can be fused onto adjacent carbon atoms;

R$_1$, R$_2$ and R$_3$ independently of one another are C$_1$-C$_4$alkyl, C$_1$-C$_4$perfluoroalkyl, phenyl or benzyl;

M is an alkali metal and M$_1$ is an alkaline earth metal;

R$_4$ and R$_{13}$ independently of one another are C$_1$-C$_6$alkyl, C$_1$-C$_6$haloalkyl, C$_1$-C$_6$hydroxyalkyl or C$_3$-C$_6$cycloalkyl;

X and X$_1$ independently of one another are —O—, —S—, —CO—, —SO— or —SO$_2$—;

R$_6$, R$_7$ and R$_8$ independently of one another are C$_1$-C$_4$alkyl, C$_1$-C$_4$perfluoroalkyl, phenyl or benzyl; and Q$_2$ is hydrogen.

The process according to the invention is particularly suitable for the polymerization of norbornene derivatives. Particularly preferred norbornene derivatives are those of either the formula V

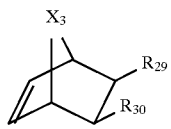
(V)

in which

X$_3$ is —CHR$_{40}$—, oxygen or sulfur;

R$_{29}$ and R$_{30}$ independently of one another are hydrogen, CN, trifluoromethyl, (CH$_3$)$_3$Si—O—, (CH$_3$)$_3$Si— or —COOR$_{31}$; and R$_{31}$ and R$_{40}$ independently of one another are hydrogen, C$_1$-C$_{12}$alkyl, phenyl or benzyl; or of the formula VI

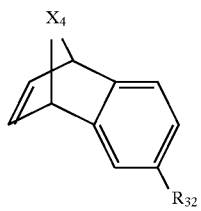
(VI)

in which

X$_4$ is —CHR$_{41}$—, oxygen or sulfur;

R$_{41}$ is hydrogen, C$_1$-C$_{12}$alkyl, phenyl or benzyl; and

R$_{32}$ is hydrogen, C$_1$-C$_6$alkyl or halogen; or of the formula VII

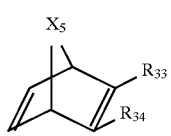
(VII)

in which

X$_5$ is —CHR$_{42}$—, oxygen or sulfur,

R$_{42}$ is hydrogen, C$_1$-C$_{12}$alkyl, phenyl or benzyl;

R$_{33}$ and R$_{34}$ independently of one another are hydrogen, CN, trifluoromethyl, (CH$_3$)$_3$Si—O—, (CH$_3$)$_3$Si— or —COOR$_{35}$; and R$_{35}$ is hydrogen, C$_1$-C$_{12}$alkyl, phenyl or benzyl;

or of the formula VIII

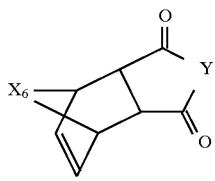
(VIII)

in which

X$_6$ is —CHR$_{43}$—, oxygen or sulfur,

R$_{43}$ is hydrogen, C$_1$-C$_{12}$alkyl, phenyl or benzyl;

Y is oxygen or

and

R$_{36}$ is hydrogen, methyl, ethyl or phenyl. The groups R$_{40}$ to R$_{43}$ are preferably bonded to the double bond in the exo position.

The compound of the formula V is preferably in the exo configuration for the use according to the invention.

The following compounds of the formula I are particularly suitable for the polymerization process according to the invention:

(1)

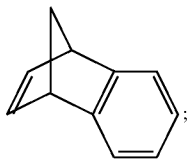
(2)

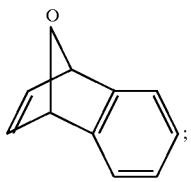
(3)

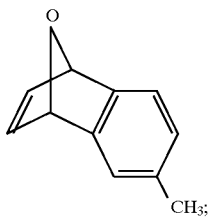
(4)

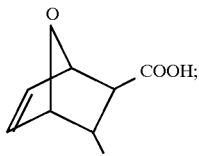
(5)

-continued
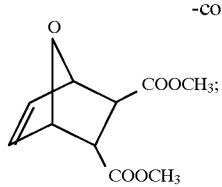 (6)
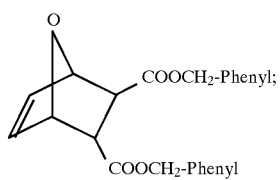 (7)
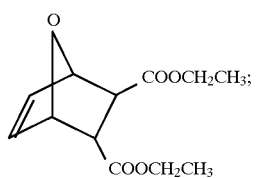 (8)
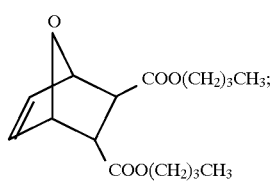 (9)
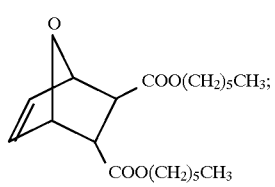 (10)
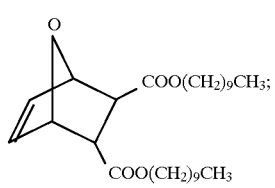 (11)
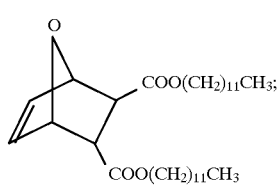 (12)
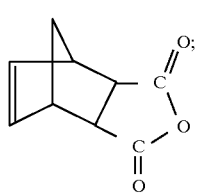 (13)
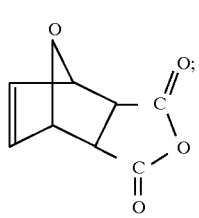 (14)
-continued
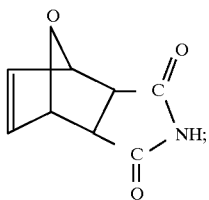 (15)
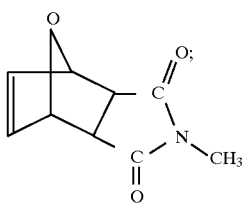 (16)
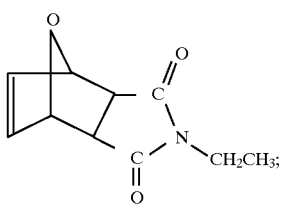 (17)
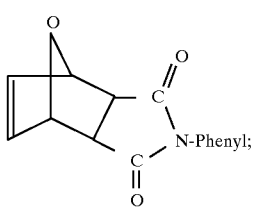 (18)
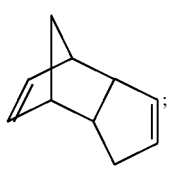 (19)
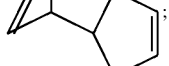 (20)
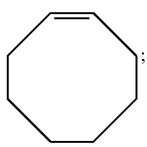 (21)
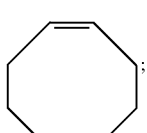 (22)
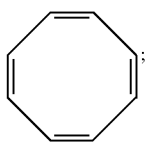 (23)
 (24)

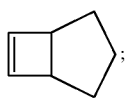 (25)

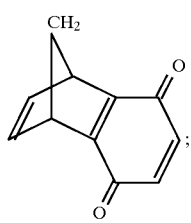 (26)

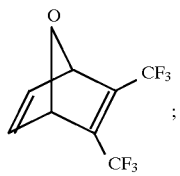 (27)

 (28)

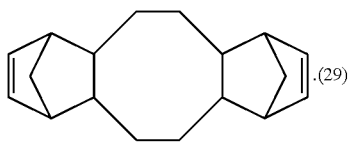 (29)

Ligands for the ruthenium and osmium compounds to be used according to the invention are organic or inorganic compounds, atoms or ions coordinated to a metal centre.

A photolabile ligand in the context of the present invention is a ligand which dissociates from the catalyst on irradiation of the catalyst with light in the visible or ultraviolet spectral range and forms a catalytically active species for the metathesis polymerization. Nonionic photolabile ligands are preferred according to the invention.

Photolabile ligands can be, for example, nitrogen ($N_2$), monocyclic, polycyclic or fused arenes having 6 to 24, preferably 6 to 18, and particularly preferably 6 to 12, C atoms which are unsubstituted or substituted by OH, $C_1$–$C_4$alkyl, $C_1$–$C_4$alkoxy, $C_6$–$C_{12}$aryl or halogen, or monocyclic heteroarenes, fused heteroarenes or fused arene-heteroarenes having 3 to 22, preferably 4 to 16, and in particular 4 to 10, C atoms and I to 3 heteroatoms chosen from the group consisting of O, S and N, which are unsubstituted or substituted by $C_1$–$C_4$alkyl, $C_1$–$C_4$alkoxy or halogen; or aliphatic, cycloaliphatic, aromatic or araliphatic nitriles having 1 to 22, preferably 1 to 18, particularly preferably 1 to 12, and especially preferably 1 to 7, C atoms which are unsubstituted or substituted by $C_1$–$C_4$alkyl, $C_1$–$C_4$alkoxy or halogen. The preferred substituents are methyl, ethyl, methoxy, ethoxy, fluorine, chlorine and bromine. The arenes and heteroarenes are preferably substituted by one or two radicals, and are particularly preferably unsubstituted. Preferred heteroarenes are the electron-rich heteroarenes. The arenes and heteroarenes can be bonded in either the π from or the σ form; in the latter case, the radicals are then the corresponding aryl and heteroaryl radicals. The aryl preferably contains 6 to 18, particularly preferably 6 to 12, C atoms. The heteroaryl preferably contains 4 to 16 C atoms.

Some examples of arenes and heteroarenes are benzene, biphenyl, naphthalene, anthracene, acenaphthene, fluorene, phenanthrene, pyrene, chrysene, fluoranthrene, furan, thiophene, pyrrole, pyridine, γ-pyran, γ-thiopyran, pyrimidine, pyrazine, indole, coumarone, thionaphthene, carbazole, dibenzofuran, dibenzothiophene, pyrazole, imidazole, benzimidazole, oxazole, thiazole, isoxazole, isothiazole, quinoline, isoquinoline, acridine, chromene, phenazine, phenoxazine, phenothiazine, triazines, thianthrene and purine. Preferred arenes and heteroarenes are benzene, naphthalene, thiophene and benzothiophene. The arene benzene and the heteroarene thiophene are particularly preferred.

The nitrites can be substituted, for example, by methoxy, ethoxy, fluorine or chlorine; the nitrites are preferably unsubstituted. The alkylnitriles are preferably linear. Some examples of nitrites are acetonitrile, propionitrile, butyronitrile, pentylnitrile, hexylnitrile, cyclopentyl- and cyclohexylnitrile, benzonitrile, methylbenzonitrile, benzylnitrile and naphthylnitrile. The nitrites are preferably linear $C_1$–$C_4$alkylnitriles or benzonitrile. The particularly preferred alkylnitrile is acetonitrile.

A preferred sub-group of the photolabile ligands comprises $N_2$, benzene, thiophene, benzonitrile and acetonitrile.

A non-photolabile ligand (also called a highly coordinating ligand) in the context of the present invention is a ligand which does not dissociate, or dissociates to only an insignificant degree, from the catalyst when the catalyst is irradiated in the visible or near ultraviolet spectral range.

Non-photolabile ligands can be, for example, solvating inorganic and organic compounds which contain the heteroatoms O, S or N and are often also used as solvents, or cyclopentadienyl or indenyl which are unsubstituted or substituted by $C_1$–$C_4$alkyl, $C_1$–$C_4$alkoxy, ($C_1$–$C_4$alkyl)$_3$Si or ($C_1$–$C_4$-Alkyl)$_3$SiO—. Examples of such compounds are $H_2O$, $H_2S$ and $NH_3$; non-halogenated or halogenated, in particular fluorinated or chlorinated, aliphatic or cycloaliphatic alcohols or mercaptans having 1 to 18, preferably 1 to 12, particularly preferably 1 to 6, C atoms, aromatic alcohols or thiols having 6 to 18, preferably 6 to 12, C atoms, or araliphatic alcohols or thiols having 7 to 18, preferably 7 to 12, C atoms; open-chain or cyclic and aliphatic, araliphatic or aromatic ethers, thioethers, sulfoxides, sulfones, ketones, aldehydes, carboxylic acid esters, lactones, non-alkylated or N—$C_1$–$C_4$-mono- or -dialkylated carboxylic acid amides having 2 to 20, preferably 2 to 12, and in particular 2 to 6, C atoms and non-alkylated or N—$C_1$–$C_4$-alkylated lactams; open-chain or cyclic and aliphatic, araliphatic or aromatic, primary, secondary and tertiary amines having 1 to 20, preferably 1 to 12, and particularly preferably 1 to 6, C atoms; and cyclopentadienyl, for example cyclopentadienyl, indenyl and cyclopentadienyls or indenyls which contain one or more methyl groups or trimethylsilyl groups.

Examples of such non-photolabile ligands are methanol, ethanol, n- and i-propanol, n-, i- and t-butanol, 1,1,1-trifluoroethanol, bistrifluoromethylmethanol, tristrifluoromethylmethanol, pentanol, hexanol, methyl- or ethylmercaptan, cyclopentanol, cyclohexanol, cyclohexylmercaptan, phenol, methylphenol, fluorophenol, phenylmercaptan, benzylmercaptan, benzyl alcohol, diethyl ether, dimethyl ether, diisopropyl ether, di-n- or di-t-butyl ether, tetrahydrofuran, tetrahydropyran, dioxane, diethyl thioether, tetrahydrothiophene, dimethyl sulfoxide, diethyl sulfoxide, tetra- and pentamethylene sulfoxide, dimethyl sulfone, diethyl sulfone, tetra- and pentamethylene sulfone, acetone, methyl ethyl ketone, diethyl ketone, phenyl methyl ketone, methyl isobutyl ketone, benzyl methyl ketone, acetaldehyde, propionaldehyde, trifluoroacetaldehyde, benzaldehyde, ethyl acetate, butyrolactone, dimethylformamide, dimethylacetamide, pyrrolidone and N-methylpyrrolidone, indenyl, cyclopentadienyl, methyl- or dimethyl- or pentamethylcyclopentadienyl and trimethylsilylcyclopentadienyl.

The primary amines can be those of the formula $R_{24}NH_2$, the secondary amines can be those of the formula $R_{24}R_{25}NH$ and the tertiary amines can be those of the formula $R_{26}R_{27}R_{28}N$, in which $R_{24}$ is $C_1$–$C_{18}$alkyl, $C_5$- or $C_6$cycloalkyl which is unsubstituted or substituted by $C_1$–$C_4$alkyl or $C_1$–$C_4$alkoxy, or $C_6$—$C_{18}$aryl or $C_7$–$C_{12}$aralkyl which is unsubstituted or substituted by $C_1$–$C_4$alkyl or $C_1$–$C_4$alkoxy, $R_{25}$ independently is as defined for $R_{24}$, or $R_{24}$ and $R_{25}$ together are tetramethylene, pentamethylene, 3-oxa-1,5-pentylene or —$CH_2$—$CH_2$—NH—$CH_2$—$CH_2$— or —$CH_2$—$CH_2$—N($C_1$–$C_4$alkyl)—$CH_2$—$CH_2$—, $R_{26}$, $R_{27}$ and $R_{28}$ independently of one another are as defined for $R_{24}$, or $R_{26}$ and $R_{27}$ together are as defined jointly for $R_{24}$ and $R_{25}$ and $R_{28}$ is as defined for $R_{24}$. The alkyl preferably contains 1 to 12, and particularly preferably 1 to 6, C atoms. The aryl preferably contains 6 to 12 C atoms, and the aralkyl preferably contains 7 to 9 C atoms. Examples of amines are methyl-, dimethyl-, trimethyl-, ethyl-, diethyl-, triethyl-, methyl-ethyl-, dimethyl-ethyl, n-propyl-, di-n-propyl-, tri-n-butyl-, cyclohexyl-, phenyl- and benzylamine, and pyrrolidine, N-methylpyrrolidine, piperidine, piperazine, morpholine and N-methylmorpholine.

A preferred sub-group of non-photolabile ligands consists of $H_2O$, $NH_3$ and unsubstituted or partly or completely fluorinated $C_1$–$C_4$alkanols. $H_2O$, $NH_3$, cyclopentadienyl, methanol and ethanol are especially preferred.

The ruthenium and osmium compounds to be used according to the invention can be mono- or polynuclear, for example those having two or three metal centres. The metal atoms here can be bonded via a bridge group or metal—metal bonds. Preferred compounds having a plurality of metal centres are those of the formula X

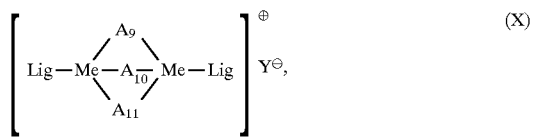

in which
Lig is a photolabile ligand and
Me is Ru or Os,
$A_9$, $A_{10}$ and $A_{11}$ are a bivalent bridge group and
$Y^\ominus$ is a monovalent non-coordinating anion.

The bridge group is preferably ionic, and particularly preferably a halide, especially preferably chloride, bromide or iodide. The photolabile ligands are preferably identical or different arenes, and $Y^\ominus$ can be the anions listed below, and especially preferably chloride, bromide or iodide. An example of such complexes is $[C_6H_6Ru(Cl)_3RuC_6H_6]Cl$.

Preferred catalysts according to the invention are those of the formula II

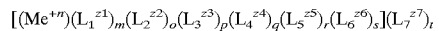

in which
Me is ruthenium or osmium;

n is 0, 1, 2, 3, 4, 5, 6, 7 or 8;

$L_1$ is a photolabile ligand;

$L_2$, $L_3$, $L_4$, $L_5$ and $L_6$ independently of one another are a non-photolabile or a photolabile ligand;

m is 1, 2, 3, 4, 5 or 6;

o, p, q, r, and s independently of one another are 0, 1, 2, 3, 4 or 5;

$z_1$, $z_2$, $z_3$, $z_4$, $z_5$, $z_6$ and $z_7$ independently of one another are −4, −3, −2, −1, 0, +1 or +2; and $L_7$ is a non-coordinating cation or anion; and in which the sum of m+o+p+q+r+s is an integer from 2 to 6, and t is the quotient of $(n+m \cdot z_1+o \cdot z_2+p \cdot z_3+q \cdot z_4+r \cdot z_5+s \cdot z_6)/z_7$.

In formula II, $L_7$ is preferably halogen (for example Cl, Br and I), the anion of an oxygen acid, $BF_4$, $PF_6$, $SiF_6$ or $AsF_6$.

The anions of oxygen acids can be, for example, sulfate, phosphate, perchlorate, perbromate, periodate, antimonate, arsenate, nitrate, carbonate, the anion of a $C_1$–$C_8$carboxylic acid, for example formate, acetate, propionate, butyrate, benzoate, phenylacetate or mono-, di- or trichloro- or -fluoroacetate, sulfonates, for example methylsulfonate, ethylsulfonate, propylsulfonate, butylsulfonate, trifluoromethylsulfonate (triflate), phenylsulfonate or benzylsulfonate which is unsubstituted or substituted by $C_1$–$C_4$alkyl, $C_1$–$C_4$alkoxy or halogen, in particular fluorine, chlorine or bromine, for example tosylate, mesylate, brosylate, p-methoxy- or p-ethoxyphenylsulfonate, pentafluorophenylsulfonate or 2,4,6-triisopropylsulfonate, and phosphonates, for example methylphosphonate, ethylphosphonate, propylphosphonate, butylphosphonate, phenylphosphonate, p-methylphenylphosphonate and benzylphosphonate.

Me in formula II is preferably ruthenium, in particular $Ru^{2+}$.

A preferred group of compounds of the formula II is that in which the ligands $L_1$, $L_2$, $L_3$, $L_4$, $L_5$ and $L_6$ independently of one another are aliphatic, cycloaliphatic, aromatic or araliphatic nitriles having 1 to 22 C atoms which are unsubstituted or substituted by $C_1$–$C_4$alkyl, $C_1$–$C_4$alkoxy or halogen, or $C_6$—$C_{18}$aryl; or $L_1$, $L_2$ and $L_3$ together are monocyclic, polycyclic or fused arenes having 6 to 24, preferably 6 to 18, and particularly preferably 6 to 12, C atoms which are unsubstituted or substituted by —OH, $C_1$–$C_4$alkyl, $C_1$–$C_4$alkoxy, $C_6$–$C_{12}$aryl or halogen, or monocyclic heteroarenes, fused heteroarenes or fused areneheteroarenes having 4 to 22 C atoms and 1 to 3 heteroatoms chosen from the group consisting of O, S and N, which are unsubstituted or substituted by —OH, $C_1$–$C_4$alkyl, $C_1$–$C_4$alkoxy or halogen, and $L_4$, $L_5$ and $L_6$ together have the same meaning, or individually independently of one another are $N_2$ or the said nitrile or the said $C_6$–$C_{18}$aryl.

A preferred sub-group of the above compounds of the formula I1 comprises those in which the ligands $L_1$, $L_2$, $L_3$, $L_4$, $L_5$ and $L_6$ independently of one another are $N_2$, $C_1$–$C_{20}$alkylnitrile, $C_6$–$C_{12}$arylnitrile, $C_7$–$C_{12}$aralkylnitrile or $C_6$–$C_{12}$aryl, or $L_1$, $L_2$ and $L_3$ in each case together are the groups Al or $A_2$ and $L_4$, $L_5$ and $L_6$ likewise together have this meaning or in each case individually are $N_2$, the said nitriles or the said $C_6$—$C_{12}$aryl,

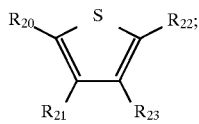 (A₂)

in which

R$_{14}$, R$_{15}$, R$_{16}$, R$_{17}$, R$_{18}$, R$_{19}$, R$_{20}$, R$_{21}$, R$_{22}$ and R$_{23}$ independently of one another are hydrogen, C$_1$–C$_{20}$alkyl C$_1$–C$_{20}$alkoxy, aryl or SiR$_{37}$R$_{38}$R$_{39}$, and wherein, in the case of groups Al and A$_2$, an aromatic or heteroaromatic ring, the heteroatoms of which are chosen from oxygen, sulfur and nitrogen, can be fused onto adjacent carbon atoms; and R$_{37}$, R$_{38}$ and R$_{39}$ independently of one another are C$_1$–C$_{12}$alkyl, phenyl or benzyl, preferably C$_1$–C$_8$alkyl, phenyl or benzyl, particularly preferably C$_1$–C$_4$alkyl, phenyl or benzyl.

Preferred compounds from this preferred group of compounds of the formula II are those in which L$_1$, L$_2$, L$_3$, L$_4$, L$_5$ and L$_6$ independently of one another are C$_1$–C$_{12}$alkylnitrile or C$_6$–C$_{12}$arylnitrile or L$_1$, L$_2$ and L$_3$ in each case together are the groups A$_1$ or A$_2$ and L$_4$, L$_5$ and L$_6$ likewise together have this meaning or in each case independently are N$_2$, the said nitriles or the said aryl, in which R$_{14}$, R$_{15}$, R$_{16}$, R$_{17}$, R$_{18}$, R$_{19}$, R$_{20}$, R$_{21}$, R$_{22}$ and R$_{23}$ independently of one another are hydrogen, C$_1$–C$_6$alkyl, C$_1$–C$_6$alkoxy, SiR$_{37}$R$_{38}$R$_{39}$ or phenyl, and in which, in the case of the groups A$_1$ and A$_2$, a benzene ring can be fused onto adjacent carbon atoms, and R$_{37}$, R$_{38}$ and R$_{39}$ are methyl, ethyl or phenyl.

In an especially preferred embodiment of the process according to the invention, the catalyst used is that of the formula II, in which L$_1$, L$_2$, L$_3$, L$_4$, L$_5$ and L$_6$ independently of one another are methylnitrile, ethylnitrile or phenylnitrile, or L$_1$, L$_2$ and L$_3$ in each case together are the groups A$_1$ or A$_2$ and L$_4$, L$_5$ and L$_6$ likewise together have this meaning or in each case individually are the said nitriles, in which R$_{14}$, R$_{15}$, R$_{16}$, R$_{17}$, R$_{18}$, R$_{19}$, R$_{20}$, R$_{21}$, R$_{22}$ and R$_{23}$ independently of one another are hydrogen, methyl, methoxy or phenyl, and in which, in the case of the groups A$_1$ and A$_2$, a benzene ring can be fused onto adjacent carbon atoms.

Another particularly preferred sub-group of the compounds of the formula II comprises those in which L$_1$, L$_2$ and L$_3$ together are monocyclic, polycyclic or fused arenes having 6 to 24, preferably 6 to 18, and particularly preferably 6 to 12, C atoms which are unsubstituted or substituted by C$_1$–C$_4$alkyl, C$_1$–C$_4$alkoxy, C$_6$–C$_{12}$aryl or halogen, or monocyclic heteroarenes, fused heteroarenes or fused arene-heteroarenes having 4 to 22, preferably 4 to 16, and in particular 4 to 10, C atoms and 1 to 3 heteroatoms chosen from the group consisting of O, S and N, which are unsubstituted or substituted by C$_1$–C$_4$alkyl, C$_1$–C$_4$alkoxy or halogen, and L$_4$, L$_5$ and L$_6$ are a non-photolabile ligand, the previous preferences also applying here.

L$_1$, L$_2$ and L$_3$ in this sub-group are preferably benzene or naphthalene, and the non-photolabile ligand is preferably H$_2$O, NH$_3$, unsubstituted or fluorine-substituted C$_1$–C$_4$alkanol or -alkanethiol, aliphatic ethers, thioethers, sulfoxides and sulfones having 2 to 8 C atoms, dimethylformamide or N-methylpyrrolidone.

Another preferred sub-group of compounds of the formula II comprises ruthenium and osmium compounds of the formula XI

 (XI), in which

L$_1$ is a photolabile ligand and

L$_8$ is a non-photolabile ligand,

Me is Ru or Os,

Y$_1$ is a non-coordinating anion and x is the number 1, 2 or 3.

The above preferences apply to the photolabile ligands, non-photolabile ligands, Me and Y$_1$. Particularly preferably, L$_1$ is N$_2$ or a nitrile, for example C$_1$–C$_4$alkylnitrile (acetonitrile), benzonitrile or benzylnitrile, L$_8$ is NH$_3$ or an amine having 1 to 12 C atoms, Y, is a non-coordinating anion and x is the number 1 or 2.

Catalysts which are particularly suitable for the present invention are (tos is tosylate and tis is 2,4,6-triisopropylphenylsulfonate): Ru(CH$_3$CN)$_6$(tos)$_2$, Ru(CH$_3$CH$_2$CN)$_6$(tos)$_2$, Ru(CH$_3$CN)$_6$(CF$_3$SO$_3$)$_2$, Ru(CH$_3$CH$_2$CN)$_6$(CF$_3$SO$_3$)$_2$, Ru(C$_6$H$_6$)$_2$(tos)$_2$, [RU(C$_6$H$_6$)(C$_6$H$_5$OCH$_3$)](BF$_4$)$_2$, [Ru(C$_6$H$_6$)(C$_6$H$_5$i-propyl)](BF$_4$)$_2$, [Ru(C$_6$H$_6$)(1,3,5-trimethylphenol)](BF$_4$)$_2$, [Ru(C$_6$H$_6$)(hexamethylbenzene)](BF4)2, [Ru(C$_6$H$_6$)(biphenyl)](BF$_4$)$_2$, [Ru(C$_6$H$_6$)(chrysene)](BF$_4$)$_2$, [Ru(C$_6$H$_6$)(naphthalene)](BF$_4$)$_2$, [Ru(cyclopentadienyl)(4-methylcumyl)]PF$_6$, [Ru(cyanophenyl)$_6$](tos)$_2$, [Ru(cyanophenyl)$_6$](CF$_3$SO$_3$)$_2$, [Ru(C$_6$H$_6$)(tetramethylthiophene)$_3$](tos)$_2$, [Ru(C$_6$H$_6$)(CH$_3$CN)$_3$](tos)$_2$, [Ru(C$_6$H$_6$)(tetramethylthiophene)$_3$](CF$_3$SO$_3$)$_2$, [Ru(C$_6$H$_6$)(CH$_3$CN)$_3$](CF$_3$SO$_3$)$_2$, [Ru(C$_6$H$_6$)(CH$_3$OH)$_3$](tos)$_2$, [Ru(C$_6$H$_6$)(CH$_3$OH)$_3$](tis)$_2$, [OS(NH$_3$)$_5$N$_2$](PF$_6$)$_2$, [RU(NH$_3$)$_5$N$_2$](PF$_6$)$_2$, [Ru(NH$_3$)$_5$(CH$_3$CN)](BF$_4$, [RU(C$_6$H$_6$(NH$_3$)$_3$](tis)$_2$, [Ru(C$_6$H$_6$(tetrahydrothiophene)$_3$](CF$_3$SO$_3$)$_2$, [Ru((CH$_3$)$_2$S)$_3$C$_6$H$_6$](tos)$_2$, [Ru(dimethyl sulfoxide)$_3$C$_6$H$_6$](PF$_6$)$_2$, [Ru(dimethylformamide)$_3$C$_6$H$_6$](PF$_6$)$_2$, [Ru(C$_6$H$_6$)Cl$_2$]$_2$ and [Os(C$_6$H$_6$)Cl$_2$]$_2$.

Catalysts to be used according to the invention are either known and in some cases commercially obtainable, or can be prepared analogously to known processes. Such catalysts and their preparation are described, for example, in J. Am. Chem. Soc. 1979, 101, 4096, J. Organomet. Chem. 1979, 175, 87, J. C. S. Dalton Trans. 1974, 233 and J. Am. Chem. Soc. 1992, 114, 8515.

The process according to the invention can be carried out in the presence of an inert solvent. A particular advantage of the process according to the invention is that, in the case of liquid monomers, the process can be carried out without using a solvent. Inert means that the choice of solvent depends on the reactivity of the ruthenium and osmium compounds, for example that protic polar solvents are not used if substitution reactions, such as replacement of halogen by alkoxy, are to be expected.

Suitable inert solvents are, for example, protic polar and aprotic solvents, which can be used by themselves or in mixtures of at least two solvents. Examples are: ethers (dibutyl ether, tetrahydrofuran, dioxane, ethylene glycol monomethyl or dimethyl ether, ethylene glycol monoethyl or diethyl ether, diethylene glycol diethyl ether and triethylene glycol dimethyl ether), halogenated hydrocarbons (methylene chloride, chloroform, 1,2-dichloroethane, 1,1,1-trichloroethane and 1,1,2,2-tetrachloroethane), carboxylic acid esters and lactones (ethyl acetate, methyl propionate, ethyl benzoate, 2-methoxyethyl acetate, ,-butyrolactone, 5-valerolactone, pivalolactone), carboxylic acid amides and lactams (N,N-dimethylformamide, N,N-diethylformamide, N,N-dimethylacetamide, tetramethylurea, hexamethylphosphoric acid triamide, γ-butyrolactam, ε-caprolactam, N-methylpyrrolidone, N-acetylpyrrolidone, N-methylcaprolactam), sulfoxides (dimethyl sulfoxide), sulfones (dimethyl sulfone, diethyl sulfone, trimethylene sulfone, tetramethylene sulfone), tertiary amines (N-methylpiperidine, N-methylmorpholine), aliphatic and aromatic hydrocarbons, for example petrol ether, pentane, hexane, cyclohexane, methylcyclohexane, benzene or substituted benzenes (chlorobenzene, o-dichlorobenzene, 1,2,4-trichlorobenzene, nitrobenzene, toluene, xylene) and nitriles (acetonitrile, propionitrile, benzonitrile, phenylacetonitrile). Preferred solvents are aprotic polar and non-polar solvents.

Preferred solvents are tetrahydrofuran, dioxane, acetone, water, alcohols, for example methanol, ethanol, propanol and butanol methylene chloride and chloroform, and mixtures thereof.

A particular advantage of the process according to the invention is to be seen in the fact that ecologically compatible solvents can be used. Solvents which are particularly suitable for the process according to the invention are therefore those from the group consisting of alcohols, such as methanol, ethanol, propanol or i-propanol, or water. It is to be particularly emphasized that the compositions of a substituted or unsubstituted cycloolefin and catalyst which are employed according to the invention for the process are often insensitive to oxygen, which allows storage and a reaction procedure without an inert gas. However, exclusion of moisture, i.e. the use of dry reaction and storage conditions, is advisable.

The monomers of the formula I and catalysts employed for the process according to the invention can be stored either separately or together as a mixture, since the catalyst used has a particularly high stability. The mixture can be stored as the ready-to-use formulation before the photochemical polymerization, which is of advantage for application of the process according to the invention on a large industrial scale. Because of the high photosensitivity, especially in UV light, storage is advantageously under exclusion of light.

The invention furthermore relates to a photopolymerizable composition comprising a cyclic olefin or at least two different cyclic olefins and a catalytically active amount of at least one heat-stable ruthenium or osmium compound which has at least one photolabile ligand bonded to a metal atom, the other coordination sites being occupied by non-photolabile ligands.

The composition according to the invention can comprise formulation auxiliaries. Suitable formulation auxiliaries are the compounds defined above as solvents. Particularly preferred solvents for the compositions according to the invention are water and ethanol. Other known auxiliaries are plasticizers, dyes, pigments, fillers, reinforcing fillers, lubricants, antioxidants, light stabilizers and mould release auxiliaries.

In the process according to the invention, it is not necessary to maintain irradiation of the reaction mixture over the entire duration of the reaction. Once the polymerization has been initiated photochemically, the subsequent course of the reaction takes place automatically, even in the dark. The irradiation time depends on the nature of the light source.

The irradiation can be carried out from the UV range via the visible range into the near IR range, depending on the absorption bands of the catalysts. UV lasers or UV lamps are preferably employed according to the invention. Irradiation of the catalyst to form a catalytically active species can be carried out either before, during or after addition of the monomers. It has proved advantageous to choose the radiation sources such that the wavelengths are in the range of the energetically reduced absorption bands of the catalysts.

Suitable irradiation times are from one minute to 8 hours, in particular 5 minutes to 4 hours. The sequence of addition of monomers and catalyst is not critical. The monomer can either be initially introduced into the reaction vessel or be added after introduction of the catalyst. Likewise, the catalyst can be irradiated beforehand and then added to the monomer. Furthermore, the solution comprising catalyst and monomer can also be irradiated.

The process according to the invention is preferably carried out at room temperature to slightly elevated temperature. An increase in temperature serves exclusively to increase the rate of reaction, since it is not the catalysts used which initiate thermal polymerization but the catalytically active species formed.

In particular, the process according to the invention is carried out at temperatures from −20° to +110° C., preferably +20° to 70° C.

A particular and surprising advantage of the process according to the invention is that the ruthenium and osmium compounds used act as thermal catalysts after the irradation. This results in the possibility of continuing and ending the polymerization by supplying heat after a short irradiation time, which offers economic and industrial advantages in various areas of production of shaped articles or coatings. In particular, the combined process is favourable for the preparation of thermoplastics.

The invention furthermore relates to a process for the photocatalytic polymerization of a cyclic olefin or at least two different cyclic olefins in the presence of a metal compound as the catalyst, which comprises a) initially activating heat-stable ruthenium or osmium compounds which comprise at least one photolabile group bonded to the metal, the other coordination sites being occupied by non-photolabile ligands, either directly by irradiation, if appropriate in a solvent, and then mixing the catalyst with at least one cycloolefin, or activating a mixture of a cycloolefin and ruthenium or osmium compound by irradiation, if appropriate in a solvent, and b) then ending the polymerization by heating and without irradiation.

The preferences defined above apply to process stage a). The irradiation time essentially depends on the desired reaction procedure. A short irradiation is chosen, for example, if the polymerization is to be only initiated by irradiation and ended by heating. Short can be an irradiation time of up to 60 seconds, preferably 5 to 60 seconds, and particularly preferably 10 to 40 seconds. A longer irradiation time is chosen, for example, if the polymerization is to be carried out chiefly by irradiation and the final polymerization is to be ended only by after-heating.

Heating in process stage b) can be a reaction temperature of 50° to 200° C., preferably 50° to 150° C., and particularly preferably 70° to 120° C.

The transition metal is preferably di- or trivalent in the ruthenium and osmium catalysts envisaged for the irradiation. If trivalent transition metals are employed, disproportionation into a divalent and a tetravalent form in general takes place, the divalent form in particular being active as the catalyst.

Catalytic amounts in the context of the present invention are preferably an amount of 0.001 to 20 mol %, particularly preferably 0.01 to 15 mol %, and especially preferably 0.1 to 10 mol %, and exceptionally preferably 0.5 to 5 mol %, based on the amount of monomer.

The invention furthermore relates to a process for the preparation of thermal catalysts for ring-opening metathesis polymerization of cyclic olefins, which comprises irradiating ruthenium or osmium compounds having a photolabile ligand bonded to a metal atom, the other coordination sites being occupied by non-photolabile ligands, in bulk or in a solvent.

Cyclohexene generally cannot be homopolymerized by olefin metathesis. This exception is known to the expert and described, for example, in K. J. Ivin, T. Saegusa, Ring-Opening Polymerisation Volume 1, page 139, Elsevier Applied Science Publishers, London and New York.

The present invention furthermore relates to radiation-cured oligomers and polymers having identical or different structural units of the formula IX

 (IX)

in which $Q_1$ and $Q_2$ are as defined under formula I.

The preferences defined above apply to these polymers. They can be homopolymers or copolymers having a random distribution of the structural units, or block polymers. They can have an average molecular weight ($\overline{Mw}$) of, for example, 500 to 2,000,000 dalton, preferably 1000 to 1,000,000 dalton (determined by GPC by comparison with a polystyrene standard of narrow distribution).

Thermoplastically deformable materials for production of shaped articles of all types, coatings and relief images can be prepared by the process according to the invention.

The polymers according to the invention can have very different properties, depending on the monomer used. Some are distinguished by a very high oxygen permeability, low dielectric constant, good heat stability and low absorption of water. Others have outstanding optical properties, for example high transparency and low refractive indices. The low shrinkage is furthermore to be mentioned in particular. They can therefore be used in widely varying industrial fields.

The compositions according to the invention are distinguished by a high adhesive strength of the surfaces of carrier materials. The coated materials furthermore are distinguished by a very high surface smoothness and gloss. Among the good mechanical properties, the low shrinkage and high impact strength are to be singled out in particular, as well as the heat resistance. The easy removal from the mould and high resistance to solvents is furthermore to be mentioned.

These polymers are suitable for the production of medical equipment, implants or contact lenses; for the production of electronic components; as binders for paints; as photocurable compositions for model construction or as adhesives for gluing substrates having low surface energy (for example Teflon, polyethylene and polypropylene), and as a photopolymerizable composition in stereolithography. The compositions according to the invention can also be used for the production of paints by photopolymerization, it being possible on the one hand for clear (transparent) and even pigmented compositions to be used. Either white or coloured pigments can be used. The production of shaped articles of all types by thermoplastic shaping processes furthermore is to be mentioned.

The photocurable compositions according to the invention are particularly suitable for the production of protective layers and relief images. The invention furthermore relates to a variant of the process according to the invention for the production of coated materials or relief images on substrates, in which a composition of cyclic olefin, catalyst and, if appropriate, solvent is applied as a layer to a carrier, for example by dipping, brushing, casting, rolling, knife-coating or whirler-coating processes, the solvent is removed, if appropriate, and the layer is irradiated for polymerization, or the layer is irradiated through a photo-mask and the non-irradiated portions are then removed with a solvent. Surfaces of substrates can be modified or protected or, for example, printed circuits, printing plates or printing rollers can be produced by this process. In the production of printed circuits, the compositions according to the invention can also be employed as solder resists. Other possible uses are the production of screen printing masks and use as radiation-curing printing inks for offset, screen and flexographic printing.

The present invention furthermore relates to a carrier material which is coated with an oligomer or polymer prepared according to the invention.

The present invention furthermore relates to a carrier material which is coated with an oligomer or polymer prepared according to the invention and which comprises a crosslinking agent. These materials are suitable for the production of protective coatings or relief images by irradiation (if appropriate under a photo-mask) and subsequent development with a solvent. Suitable crosslinking agents, which the materials can comprise, for example, in an amount of 0.01 to 20% by weight, are, in particular, organic bisazides, in particular the commercially obtainable 2,6bis(4-azidobenzylidene)-4-methyl-cyclohexanone.

The present invention furthermore relates to a coated carrier material, wherein a layer of at least one cyclic olefin which comprises catalytic amounts of a heat-stable ruthenium or osmium catalyst which has at least one photolabile ligand bonded to the metal atom, the other coordination sites (if present) being occupied by non-photolabile ligands, is applied to a substrate.

Suitable substrates (carrier materials) are, for example, those of glass, minerals, ceramics, plastics, wood, metals, metal oxides and metal nitrides. The layer thicknesses essentially depend on the desired use, and can be, for example, 0.1 to 1000 µm, preferably 0.5 to 500 µm, particularly preferably 1 to 100 µm. The coated materials are distinguished by a high adhesive strength and good thermal and mechanical properties.

The following examples illustrate the invention further.

PREPARATION EXAMPLES

Preparation of Monomers for the Ring-opening Metathesis Polymerization

Preparation of 7-oxabicyclo[2.2.1]5,6-di(phenylmethoxycarbonyl)-hept-2-ene (compound No. 1.01)

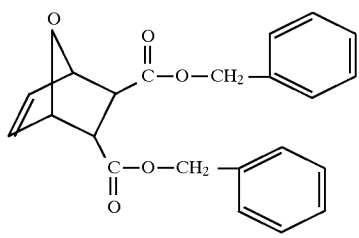

(1.01)

from a maleic anhydride of the formula A 23.26 g of a maleic anhydride of the formula A

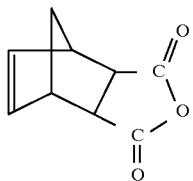

(A)

and 151.4 g of benzyl alcohol are introduced into a reaction vessel and the mixture is heated to a temperature of 50° C., while stirring. 5 ml of concentrated hydrochloric acid (37%) are then added dropwise and the reaction mixture is stirred for one hour- After cooling and distillation in vacuo under a pressure of 266 Pa and at a boiling point of 60° C. (to remove excess benzyl alcohol, water and HCl), 44.5 g (87.2% of theory) of 7-oxabicyclo[2.2.1]5,6-di(phenylmethoxycarbonyl)-hept-2-ene (compound No. 1.01) with a melting point of 85° C. are obtained. $^1$H-NMR (CDCl$_3$): 2.85 (2H); 4.94, 5.08 (4H); 5.29 (2H); 6.44 (2H); 7.31, m, (10 H).

The compounds of the formula III listed in Table 1 are prepared in an analogous manner:

TABLE 1

Compounds of the formula III (exo configuration):

(III)

| Compound No. | $R_1$ | Reaction time/ temperature | Yield [%] | Melting point [°C.] | IR (C=O) cm$^{-1}$ |
|---|---|---|---|---|---|
| 1.02 | —CH$_2$—CH$_3$ | 2 hours/50° C. | 83 | 20 | 1745 |
| 1.03 | —(CH$_2$)$_3$—CH$_3$ | 2 hours/50° C. | 77 | fl. | 1738 |
| 1.04 | —(CH$_2$)$_5$—CH$_3$ | 2 hours/50° C. | 74 | fl. | 1730 |
| 1.05 | —(CH$_2$)$_9$—CH$_3$ | 2 hours/50° C. | 95 | 25 | 1738 |
| 1.06 | —(CH$_2$)$_{11}$—CH$_3$ | 17 hours/50° C. | 88 | 45 | 1740 |

Preparation of the polymers from compounds of the formula I:

TABLE 2

Monomers employed for the polymerization:

| Structure | No. |
|---|---|
|  | 1 |
|  | 2 |
|  | 3 |
|  | 4 |
| COOH / COOH | exo: 5A; endo: 5B; mixture: 5C |
| COOCH$_3$ / COOCH$_3$ | exo: 6A; endo: 6B; mixture: 6C |
| COOCH$_2$-Phenyl / COOCH$_2$-Phenyl | exo: 7A; endo: 7B; mixture: 7C |
| COOCH$_2$CH$_3$ / COOCH$_2$CH$_3$ | exo: 8A; endo: 8B; mixture: 8C |
| COO(CH$_2$)$_3$CH$_3$ / COO(CH$_2$)$_3$CH$_3$ | exo: 9A; endo: 9B; mixture: 9C |
| COO(CH$_2$)$_5$CH$_3$ / COO(CH$_2$)$_5$CH$_3$ | exo: 10A; endo: 10B; mixture: 10C |

TABLE 2-continued

Monomers employed for the polymerization:

| Structure | No. |
|---|---|
| (norbornene with two COO(CH$_2$)$_9$CH$_3$ groups, O at top) | exo: 11A; endo: 11B; mixture: 11C |
| (norbornene with two COO(CH$_2$)$_{11}$CH$_3$ groups, O at top) | exo: 12A; endo: 12B; mixture: 12C |
| (norbornene dicarboxylic anhydride) | exo: 13A; endo: 13B; mixture: 13C |
| (norbornene dicarboxylic anhydride variant) | exo: 14A; endo: 14B; mixture: 14C |
| (norbornene dicarboximide, NH) | exo: 15A; endo: 15B; mixture: 15C |
| (norbornene dicarboximide, N-CH$_3$) | exo: 16A; endo: 16B; mixture: 16C |
| (norbornene dicarboximide, N-CH$_2$CH$_3$) | exo: 17A; endo: 17B; mixture: 17C |
| (norbornene dicarboximide, N-Phenyl) | exo: 18A; endo: 18B; mixture: 18C |

TABLE 2-continued

Monomers employed for the polymerization:

| Structure | No. |
|---|---|
| (dicyclopentadiene) | exo: 19A; endo: 19B; mixture: 19C |
| (cyclooctene) | 20 |
| (norbornene with two CF$_3$ groups, O at top) | 21 |

TABLE 3

Catalyst employed for the polymerization:

| No. | Catalyst: |
|---|---|
| 1 | Ru(CH$_3$CN)$_6$tos$_2$ |
| 2 | Ru(CH$_3$CH$_2$CN)$_6$tos$_2$ |
| 3 | Ru(CH$_3$CN)$_6$(CF$_3$SO$_3$)$_2$ |
| 4 | Ru(CH$_3$CH$_2$CN)$_6$(CF$_3$SO$_3$)$_2$ |
| 5 | Ru(C$_6$H$_6$)$_2$tos$_2$ |
| 6 | [Ru(C$_6$H$_6$)(C$_6$H$_5$OCH$_3$)](BF$_4$)$_2$ |
| 7 | [Ru(C$_6$H$_6$)(C$_6$H$_5$i-propyl)](BF$_4$)$_2$ |
| 8 | [Ru(C$_6$H$_6$)(1,3,5-trimethylphenol)](BF$_4$)$_2$ |
| 9 | [Ru(C$_6$H$_6$)(hexamethylbenzene)](BF$_4$)$_2$ |
| 10 | [Ru(C$_6$H$_6$)(biphenyl)](BF$_4$)$_2$ |
| 11 | [Ru(C$_6$R$_6$)(chrysene)](BF$_4$)$_2$ |
| 12 | [Ru(C$_6$H$_6$)(naphthalene)](BF$_4$)$_2$ |
| 13 | [Ru(cyclopentadienyl)(4-methylcumyl)]PF$_6$ |
| 14 | [Ru(cyanophenyl)$_6$](tos)$_2$ |
| 15 | [Ru(cyanophenyl)$_6$](CF$_3$SO$_3$)$_2$ |
| 16 | [Ru(NH$_3$)$_5$N$_2$](PF$_6$)$_2$ |
| 17 | [Os(C$_6$H$_6$)Cl$_2$]$_2$ |
| 18 | [Ru(C$_6$H$_6$)(CH$_3$OH)$_3$(tos)$_2$ |
| 19 | [Ru(C$_6$H$_6$)(CH$_3$OH)$_3$(tis)$_2$ | in which tos is tosylate and tis is 2,4,6-triisopropylphenylsulfonate and chrysene is the group

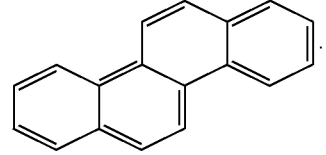

TABLE 4

Solvents employed for the polymerization:

| No. | Solvent |
|---|---|
| 1 | Ethanol |
| 2 | Water |
| 3 | Acetone |
| 4 | Dioxane |
| 5 | Chloroform |

TABLE 5

Light sources employed for the polymerization:

| No. | Light source |
|---|---|
| 1 | Ar-UV laser (331, 351, 364 mm) 500 mW/mm$^2$ |
| 2 | Ar-UV laser (331, 351, 364 mm) 350 mW/mm$^2$ |
| 3 | Hg immersion lamp TQ 150 |
| 4 | UV lamp 500 W, 20 mW/mm$^2$ |

Table 6: Examples of the process according to the invention (RT is room temperature):

TABLE 6a

| Experiment No. | Monomer/ amount [mg] | Catalyst/ amount [mg] | Solvent/ amount temperature (°C.) | Light source (time/ minutes) |
|---|---|---|---|---|
| 1 | 3; 55 | 3; 82, 5 | 1 + 2(50/1);51 ml; 50° C. | 1; 30 |
| 2 | 3; 200 | 1; 2 | 1; 1 ml; 50° C. | 2; 51; |
| 3 | 3; 400 | 5; 0.08 | 1 + 2(2/1);10 ml; R.T. | 3; 240 |
| 4 | 3; 400 | 5; 2 | 1 + 2(2/1);10 ml; R.T. | 3; 240 |
| 5 | 3; 400 | 6; 0.1 | 1 + 2(2/1);10 ml; R.T. | 3; 240 |
| 6 | 3; 400 | 6; 2.48 | 1 + 2(2/1);10 ml; R.T. | 3; 240 |
| 7 | 3; 400 | 7; 2.4 | 1 + 2(2/1);10 ml; R.T. | 3; 240 |
| 8 | 3; 10 | 14; 10 | 1,5 ml; 40° C. | 1; 30 |
| 9 | 4; 10 | 2; 5 | —; 50° C. | 1; 5 |
| 10 | 3; 200 | 9; 2.7 | 1 + 2(1/1);2 ml; 50° C. | 1; 5 |
| 11 | 7A; 400 | 2; 2 | 1 + 3(1/1);5 ml; 50° C. | 1; 5 |
| 12 | 6A; 400 | 2; 2 | 1 + 3(1/1);7 ml; 50° C. | 1; 5 |
| 13 | 19A + B (88:12) 400 | 2; 2 | 1; 0.5 ml; 50° C. | 1; 5 |
| 14 | 10A; 400 | 1; 2 | 1, 8 ml; 50° C. | 1; 5 |
| 15 | 4; 20 | 1; 1 | —, R.T. | 4; 5 |
| 16 | 4; 500 | 16; 5 | 5; 3m1; 50° C. | 4; 15 |
| 17 | 4; 500 | 17; 5 | 5; 3m1; 50° C. | 4; 15 |
| 18 | 1; 500 | 18; 3 | 5; 3m1; 50° C. | 4; 10 |
| 19 | 6A; 500 | 18; 3 | 5; 3m1; 50° C. | 4; 10 |
| 20 | 1, 500 | 19; 3 | 5; 3m1; 50° C. | 4; 30 |

TABLE 6b

| Experiment No. | Standing time before working up [hours] | Yield [%] | GPC* Mn; Mw(g/mol) |
|---|---|---|---|
| 1 | 14; R.T. | 68 | 6.3K; 125K |
| 2 | 1; R.T. | 20 | 2.4K; 10.4K |
| 3 | 72; R.T. | 42 | 20K; 44K |
| 4 | 72; R.T. | 77 | 6.8K; 28K |
| 5 | 72; R.T. | 12 | 28K; 86K |
| 6 | 72; R.T. | 88 | 10K; 40K |
| 7 | 72; R.T. | 75 | 6.3K; 22K |
| 8 | 17; 40° C. | 100 | 14K; 56K |
| 9 | 17; R.T. | 100 | 13K; 50K |
| 10 | 17; 40° C. | 92 | 5.7K; 179K |
| 11 | 17; 50° C. | 49 | 1.2K; 1700K |
| 12 | 17; 50° C. | 32 | 1.5K; 370K |
| 13 | 17; 50° C. | 20 | 0.25K; 180K |
| 14 | 17; 50° C. | 32 | 7K; 20K |
| 15 | R.T. | 10 | 0.54K; 20K |
| 16 | 50; 50° C. | 20 | 3, 8K; 8, 6K |
| 17 | 50; 50° C. | 20 | 3, 6K; 5, 0K |
| 18 | —; RT | 84 | 15, 2K; 480K |
| 19 | 3: 50° C. | 78 | 22, 7K; 55, 0K |
| 20 | —; RT | 73 | 290K; 570K |

*based on PS standards (not absolute), K = 1000

COMPARISON EXAMPLE A

Irradiation of 200 mg of monomer 3 in solvent 1 and light source 1 for a period of 10 minutes and a standing time of 7 days at a temperature of 50° C. without the presence of a catalyst according to the invention results in no polymer formation.

COMPARISON EXAMPLE B

A solution of 20% by weight of [bicyclo(2,2,1)hept-2-ene] and 0.33% by weight of [Ru(acetonitrile)$_6$](triflate)$_2$ in ethanol is stored in the dark at 50° C. for 96 hours. After this period, the solution is slightly cloudy; however, no measurable amount of polymer can be isolated.

What is claimed is:

1. A process for the photochemically induced polymerization of a cyclic olefin or at least two different cyclic olefins in the presence of a metal compound as catalyst, which comprises:

a) initially activating a heat-stable ruthenium or osmium compound i) wherein at least two photolabile ligands are bonded to one metal atom and are selected from the group consisting of monocyclic, polycyclic and fused arenes having 6 to 24 C-atoms which are unsubstituted or substituted by substituents, from the group consisting of OH, $C_1$–$C_4$-alkyl, $C_1$–$C_4$-alkoxy, $C_6$–$C_{12}$-aryl and halogen; or ii) wherein one or more photolabile ligands are bonded to the metal atom and are selected from the group consisting of nitrogen, monocyclic heteroarenes, fused heteroarenes and fused arene-heteroarenes having 3 to 22 C-atoms and 1 to 3 heteroatoms selected from the group consisting of O, S, and N, which are unsubstituted or substituted by substituents selected from the group consisting of $C_1$–$C_4$-alkyl, $C_1$–$C_4$-alkoxy and halogen; or iii) wherein one or more photolabile ligands are bonded to one metal atom and are selected from the group consisting of aliphatic, cycloaliphatic, aromatic and araliphatic nitrites which are unsubstituted or substituted by substituents selected from the group consisting of $C_1$–$C_4$-alkyl, C.–$C_4$-alkoxy and halogen;

subject to the proviso that none of the photolabile ligands from the group i) are present in the catalyst together with photolabile ligands either from the group ii) or the group iii);

the-remaining coordination sites being occupied by non-photolabile ligands; by exposing the compound to radiation from a light source, radiating in the range, selected from the ultraviolet, visible, and infrared range, and then mixing with at least one olefin ; or by activating a mixture of cyclic olefin and the ruthenium or osmium compound by exposing the mixture to radiation from the light source, and b) then ending the polymerization by heating and without radiation.

2. A process according to claim 1, wherein the cyclic olefins are monocyclic rings or polycyclic ring systems having 2 to 4 rings, which are unsubstituted or substituted, can contain one or more heteroatoms from the group consisting of O, S, N and Si in one or more rings, and can contain fused aromatic or heteroaromatic rings.

3. A process according to claim 2, wherein the cyclic rings contain 3 to 16 ring members.

4. A process according to claim 3, wherein the cyclic rings contain 3 to 12 ring members.

5. A process according to claim 2, wherein the cyclic olefins contain further non-aromatic double bonds.

6. A process according to claim 1, wherein the cycloolefins are those of the formula I

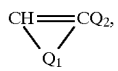
(I)

in which

Q$_1$ is a radical having at least one carbon atom which, together with the —CH═CQ$_2$- group, forms an at least 3-membered alicyclic ring which can contain one or more heteroatoms chosen from the group consisting of silicon, phosphorus, oxygen, nitrogen or sulfur, and which is unsubstituted or substituted by halogen, ═O, —CN, —NO$_2$, R$_1$R$_2$R$_3$Si—(O)$_u$—, —COOM, —SO$_3$M, —PO$_3$M, —COO(M)$_{1/2}$, —SO$_3$(M$_1$)i12, —PO$_3$(M$_1$)$_{1/2}$, C$_1$–C$_{20}$alkyl, C$_1$–C$_{20}$hydroxyalkyl C$_1$–C$_{20}$haloalkyl, C$_1$–C$_6$cyanoalkyl, C$_3$–C$_8$cycloalkyl, C$_6$–C$_{16}$aryl, C$_7$–C$_{16}$aralkyl, C$_3$–C$_6$heterocycloalkyl, C$_3$–C$_{16}$heteroaryl, C$_4$–C$_{16}$heteroaralkyl or R$_4$—X—; or in which two adjacent C atoms are substituted by —CO—O—CO— or —CO—NR$_5$—CO—; or in which an aromatic or heteroaromatic ring, which is unsubstituted or substituted by halogen, —CN, —NO$_2$, R$_6$R$_7$R$_8$Si—(O)$_u$—, —COOM, —SO$_3$M, —PO$_3$M, —COO(Mi)$_{1/2}$, —SO$_3$(M)$_{1/2}$, —PO$_3$(M$_1$)$_{1/2}$, C$_1$–C$_{20}$alkyl, C$_1$–C$_{20}$haloalkyl, C$_1$–C$_{20}$hydroxyalkyl, C$_1$–C$_6$cyanoalkyl, C$_3$–C$_8$cycloalkyl, C$_6$–C$_{16}$aryl, C$_7$–C$_{16}$aralkyl, C$_3$–C$_6$heterocycloalkyl, C$_3$–C$_{16}$heteroaryl, C$_4$–C$_{16}$heteroaralkyl or R$_{13}$—X$_1$—, is fused onto adjacent carbon atoms of the alicyclic ring;

X and X$_1$ independently of one another are —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—;

R$_1$, R$_2$ and R$_3$ independently of one another are C$_1$–C$_{12}$alkyl, C$_1$–C$_{12}$perfluoroalkyl, phenyl or benzyl;

R$_4$ and R$_{13}$ independently of one another are C$_1$–C$_{20}$alkyl, C$_1$–C$_{20}$haloalkyl, C$_1$–C$_{20}$hydroxyalkyl, C$_3$–C$_8$cycloalkyl, C$_6$–C$_{16}$aryl or C$_7$–C$_{16}$aralkyl;

R$_5$ and R$_{10}$ independently of one another are hydrogen, C$_1$–C$_{12}$alkyl, phenyl or benzyl, the alkyl groups in turn being unsubstituted or substituted by C$_1$–C$_{12}$alkoxy or C$_3$–C$_8$cycloalkyl;

R$_6$, R$_7$ and R$_8$ independently of one another are C$_1$–C$_{12}$alkyl, C$_1$–C$_{12}$perfluoroalkyl, phenyl or benzyl;

M is an alkali metal and

M$_1$ is an alkaline earth metal; and u is 0 or 1;

and in which the alicyclic ring formed with Q$_1$ can contain further non-aromatic double bonds;

Q$_2$ is hydrogen, C$_1$–C$_{20}$alkyl, C$_1$–C$_{20}$haloalkyl, C$_1$–C$_{12}$alkoxy, halogen, —CN or R$_{11}$—X$_2$—; R$_{11}$ is C$_1$–C$_{20}$alkyl, C$_1$–C$_{20}$haloalkyl, C$_1$–C$_{20}$hydroxyalkyl, C$_3$–C$_8$cycloalkyl, C$_6$–C$_{16}$aryl or C$_7$–C$_{16}$aralkyl;

X$_2$ is —C(O)—O— or —C(O)—NR$_{12}$—;

R$_{12}$ is hydrogen, C$_1$–C$_{12}$alkyl, phenyl or benzyl; and in which the abovementioned cycloalkyl, heterocycloalkyl, aryl, heteroaryl, aralkyl and heteroaralkyl groups are unsubstituted or substituted by C$_1$–C$_{12}$alkyl, C$_1$–C$_{12}$alkoxy, —NO$_2$, —CN or halogen, and in which the heteroatoms of the abovementioned heterocycloalkyl, heteroaryl and heteroaralkyl groups are chosen from the group consisting of —O—, —S—, —NR$_9$— and —N═; and R$_9$ is hydrogen, C$_1$–C$_{12}$alkyl, phenyl or benzyl.

7. A process according to claim 6, wherein the alicyclic ring which Q$_1$ forms together with the —CH═CQ$_2$— group has 3 to 16 ring atoms, and wherein the ring is a monocyclic, bicyclic, tricyclic or tetracyclic ring system.

8. A process according to claim 7, wherein Q$_2$ in formula I is hydrogen.

9. A process according to claim 6, wherein, in the compounds of the formula I, Q$_1$ is a radical having at least one carbon atom which, together with the —CH═CQ$_2$- group, forms a 3- to 20-membered alicyclic ring which can contain one or more heteroatoms chosen from the group consisting of silicon, oxygen, nitrogen and sulfur, and which is unsubstituted or substituted by halogen, ═O, —CN, —NO$_2$, R$_1$R$_2$R$_3$Si—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_{12}$alkyl, C$_1$–C$_{12}$haloalkyl, C$_1$–C$_{12}$hydroxyalkyl, C$_1$–C$_4$cyanoalkyl, C$_3$–C$_6$cycloalkyl, C$_6$–C$_{12}$aryl, C$_7$–C$_{12}$aralkyl, C$_3$–C$_6$heterocycloalkyl, C$_3$–C$_{12}$heteroaryl, C$_4$–C$_{12}$heteroaralkyl or R$_4$—X—; or in which two adjacent C atoms in this radical Q$_1$ are substituted by —CO—O—CO— or —CO—NR$_5$—CO—; or in which an aromatic or heteroaromatic ring which is unsubstituted or substituted by halogen, —CN, —NO$_2$, R$_6$R$_7$R$_8$Si—, —COOM, -S0$_3$M, —PO$_3$M, —COO(M$_1$)$_{1/2}$, —SO$_3$(M$_1$)$_{1/2}$, —PO$_3$(M$_1$)$_{1/2}$, C$_1$–C$_{12}$alkyl, C$_1$–C$_{12}$haloalkyl, C$_1$–C$_{12}$hydroxyalkyl, C$_1$–C$_4$cyanoalkyl, C$_3$–C$_6$cycloalkyl, C$_6$–C$_{12}$aryl, C$_7$–C$_{12}$aralkyl, C$_3$–C$_6$heterocycloalkyl, C$_3$–C$_{12}$heteroaryl, C$_4$–C$_{12}$heteroaralkyl or R$_{13}$—X$_1$— can be fused onto adjacent carbon atoms;

X and X$_1$ independently of one another are —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—; and R$_1$, R$_2$ and R$_3$ independently of one another are C$_1$–C$_6$alkyl, C$_1$–C$_6$perfluoroalkyl, phenyl or benzyl;

M is an alkali metal and

M$_1$ is an alkaline earth metal;

R$_4$ and R$_{13}$ independently of one another are C$_1$–C$_{12}$alkyl, C$_1$–C$_{12}$haloalkyl, C$_1$–C$_{12}$hydroxyalkyl, C$_3$–C$_8$cycloalkyl, C$_6$–C$_{12}$aryl or C$_7$–C$_{12}$aralkyl;

R$_5$ and R$_{10}$ independently of one another are hydrogen, C$_1$–C$_6$alkyl, phenyl or benzyl, the alkyl groups in turn being unsubstituted or substituted by C$_1$–C$_6$alkoxy or C$_3$–C$_6$cycloalkyl;

R$_6$, R$_7$ and R$_8$ independently of one another are C$_1$–C$_6$alkyl, C$_1$–C$_6$perfluoroalkyl, phenyl or benzyl;

u is 0 or 1;

and in which the alicyclic ring formed with Q$_1$ can contain further non-aromatic double bonds;

Q$_2$ is hydrogen, C$_1$–C$_{12}$alkyl, C$_1$–C$_{12}$haloalkyl, C$_1$–C$_6$alkoxy, halogen, —CN or R$_{11}$—X$_2$—;

R$_{11}$ is C$_1$–C$_{12}$alkyl, C$_1$–C$_{12}$haloalkyl, C$_1$–C$_{12}$hydroxyalkyl, C$_3$–C$_6$cycloalkyl, C$_6$–C$_{12}$aryl or C$_7$–C$_{12}$aralkyl;

X$_2$ is —C(O)—O— or —C(O)—NR$_{12}$—; and

R$_{12}$ is hydrogen, C$_1$–C$_6$alkyl, phenyl or benzyl;

and in which the cycloalkyl, heterocycloalkyl, aryl, heteroaryl, aralkyl and heteroaralkyl groups are unsubstituted or substituted by C$_1$–C$_6$alkyl, C$_1$–C$_6$alkoxy, —NO$_2$, —CN or halogen, and in which the heteroatoms of the heterocycloalkyl, heteroaryl and heteroaralkyl groups are chosen from the group consisting of —O—, —S—, —NR$_9$— and —N═; and R$_9$ is hydrogen, C$_1$–C$_6$alkyl, phenyl or benzyl.

10. A process according to claim 6, wherein, in the compounds of the formula I, Q$_1$ is a radical having at least one carbon atom which, together with the —CH═CQ$_2$- group, forms a 3- to 8-membered alicyclic ring which can contain a heteroatom chosen from the group consisting of silicon, oxygen, nitrogen and sulfur and which is unsubstituted or substituted by halogen, —CN, —NO$_2$, R$_1$R$_2$R$_3$Si—, —COOM, —SO$_3$M, —PO$_3$M, —COO(M$_1$)$_{1/2}$, —SO$_3$(M)$_{1/2}$, —PO$_3$(M$_1$)$_{1/2}$, C$_1$–C$_6$alkyl, C$_1$–C$_6$haloalkyl, C$_1$–C$_6$hydroxyalkyl, C$_1$–C$_4$cyanoalkyl, C$_3$–C$_6$cycloalkyl, phenyl, benzyl or R$_4$—X—; or in which an aromatic or heteroaromatic ring which is unsubstituted or substituted by halogen, —CN, —NO$_2$, R$_6$R$_7$R$_8$Si—, —COOM, —SO$_3$M, —PO$_3$M, —COO(M$_1$)$_{1/2}$, —SO$_3$(M$_1$)$_{1/2}$, PO$_3$(M$_1$)$_{1/2}$, C$_1$–C$_6$alkyl, C$_1$–C$_6$haloalkyl, C$_1$–C$_6$hydroxyalkyl, C$_1$–C$_4$cyanoalkyl, C$_3$–C$_6$cycloalkyl, phenyl, benzyl or R$_{13}$—X$_1$— can be fused onto adjacent carbon atoms;

R$_1$, R$_2$ and R$_3$ independently of one another are C$_1$–C$_4$alkyl, C$_1$–C$_4$perfluoroalkyl, phenyl or benzyl;

M is an alkali metal and M$_1$ is an alkaline earth metal;

R$_4$ and R$_{13}$ independently of one another are C$_1$–C$_6$alkyl, C$_1$–C$_6$haloalkyl, C$_1$–C$_6$hydroxyalkyl or C$_3$–C$_6$cycloalkyl;

X and X$_1$ independently of one another are —O—, —S—, —CO—, —SO— or —SO$_2$—;

R$_6$, R$_7$ and R$_8$ independently of one another are C$_1$–C$_4$alkyl, C$_1$–C$_4$perfluoroalkyl, phenyl or benzyl; and Q$_2$ is hydrogen.

11. A process according to claim 6, wherein the cyclic olefin of the formula I is chosen from the group consisting of

(1)

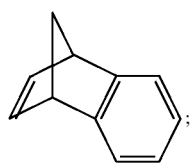

(2)

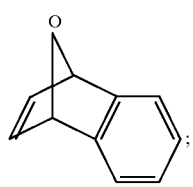

(3)

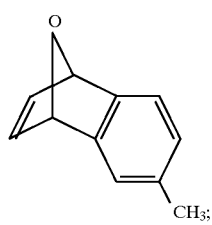

(4)

-continued

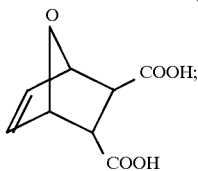

(5)

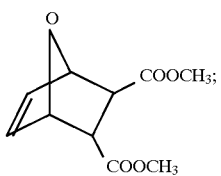

(6)

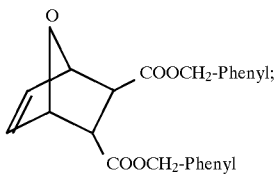

(7)

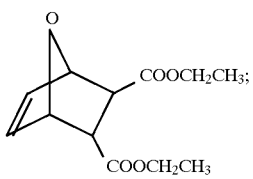

(8)

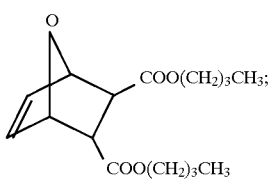

(9)

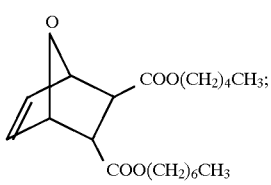

(10)

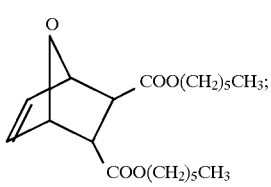

(11)

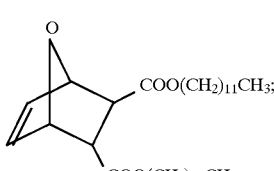

(12)

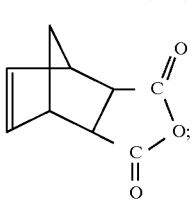

(13)

-continued

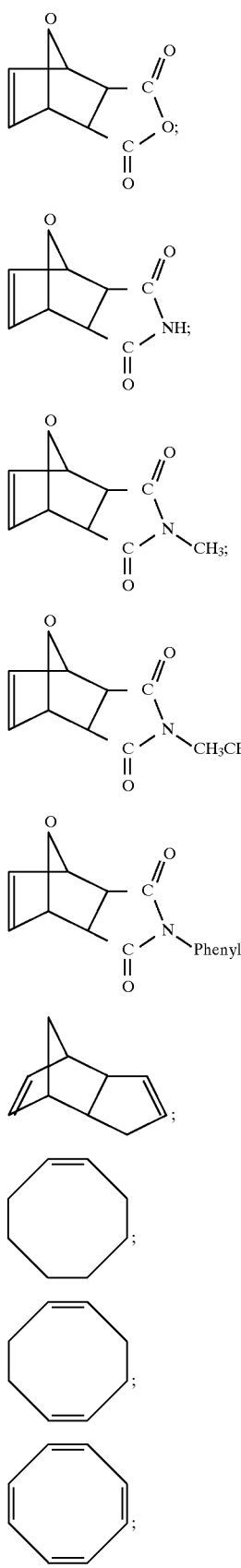

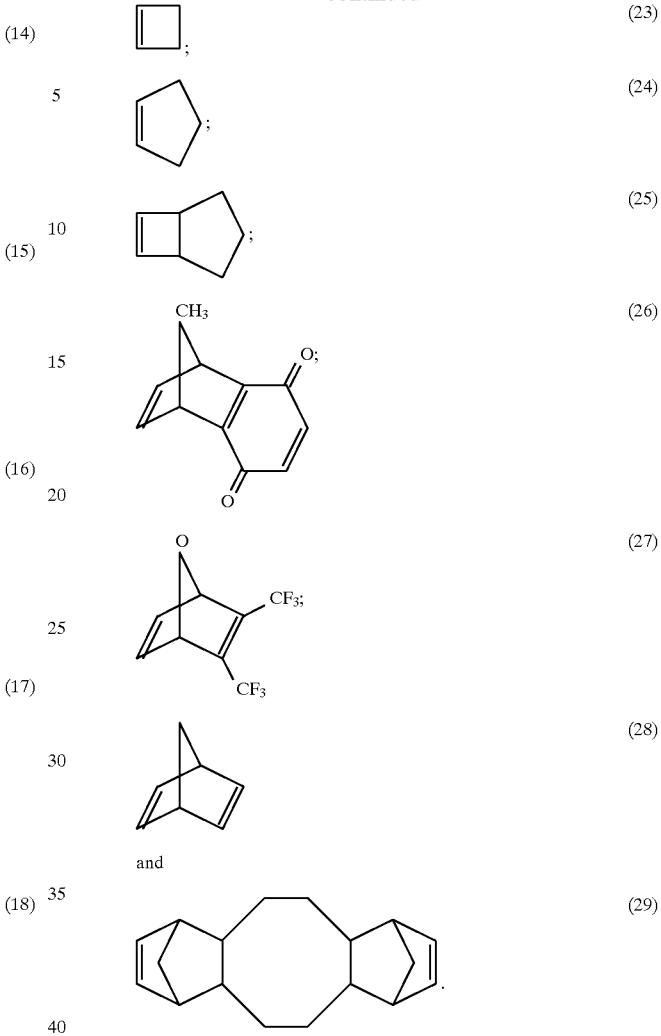

12. A process according to claim 1, wherein the cyclic olefins are norbornene or norbornene derivatives.

13. A process according to claim 12, wherein a compound of the formula V

in which $X_3$ is —$CHR_{40}$—, oxygen or sulfur, $R_{29}$ and $R_{30}$ independently of one another are hydrogen, CN, trifluoromethyl, $(CH_3)_3Si$—O— or —$COOR_{31}$; and $R_{31}$ and $R_{40}$ independently of one another are hydrogen, $C_1$–$C_{12}$alkyl, phenyl or benzyl;

is polymerized as the norbornene derivative.

14. A process according to claim 12, wherein a norbornene derivative of the formula VI

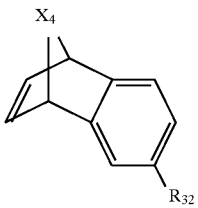

(VI)

in which

X$_4$ is —CHR$_{41}$—, oxygen or sulfur;

R$_{41}$ is hydrogen, C$_1$–C$_{12}$alkyl, phenyl or benzyl; and

R$_{32}$ is hydrogen, C$_1$–C$_6$alkyl or halogen;

is polymerized.

15. A process according to claim 12, wherein a norbornene derivative of the formula VII

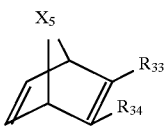

(VII)

in which

X$_5$ is —CHR$_{42}$—, oxygen or sulfur,

R$_{42}$ is hydrogen, C$_1$–C$_{12}$alkyl, phenyl or benzyl;

R$_{33}$ and R$_{34}$ independently of one another are hydrogen, CN, trifluoromethyl, (CH$_3$)$_3$Si—O— or —COOR$_{35}$; and R$_{35}$ is hydrogen, C$_1$–C$_{12}$alkyl, phenyl or benzyl;

is polymerized.

16. A process according to claim 12, wherein a norbornene derivative of the formula VIII

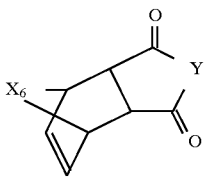

(VIII)

in which

X$_6$ is —CHR$_{43}$—, oxygen or sulfur,

R$_{43}$ is hydrogen, C$_1$–C$_{12}$alkyl, phenyl or benzyl;

Y is oxygen or

and

R$_{36}$ is hydrogen, methyl, ethyl or phenyl;

is polymerized.

17. A process according to claim 1, wherein the arene and heteroarene are selected from the group consisting of unsubstituted or substituted benzene, biphenyl, naphthalene, anthracene, acenaphthene, fluorene, phenanthrene, pyrene, chrysene, fluoranthrene, furan, thiophene, pyrrole, pyridine, γ-pyran, γ-thiopyran, pyrimidine, pyrazine, indole, coumarone, thionaphthene, carbazole, dibenzofuran, dibenzothiophene, pyrazole, imidazole, benzimidazole, oxazole, thiazole, isoxazole, isothiazole, quinoline, isoquinoline, acridine, chromene, phenazine, phenoxazine, phenothiazine, triazines, thianthrene and purine.

18. A process according to claim 1, wherein the nitrile is unsubstituted or substituted acetonitrile, propionitrile, butyronitrile, pentylnitrile, hexylnitrile, cyclopentyl- and cyclohexylnitrile, benzonitrile, methylbenzonitrile, benzylnitrile and naphthylnitrile.

19. A process according to claim 1, wherein the non-photolabile ligand is a solvating inorganic or organic compound which contains the heteroatoms O, S or N, or cyclopentadienyl or indenyl which is unsubstituted or substituted by C$_1$–C$_4$alkyl, C$_1$–C$_4$alkoxy, (C$_1$–C$_4$alkyl)$_3$Si or (C$_1$–C$_4$alkyl)$_3$SiO—.

20. A process according to claim 19, wherein the non-photolabile ligand is H$_2$O, H$_2$S or NH$_3$; a fluorinated or chlorinated aliphatic or cycloaliphatic alcohol or mercaptan having 1 to 18 C atoms; an aromatic alcohol or thiol having 6 to 18 C atoms or araliphatic alcohol or thiol having 7 to 18 C atoms; an open-chain or cyclic and aliphatic, araliphatic or aromatic ether, thioether, sulfoxide, sulfone, ketone, aldehyde, carboxylic acid ester, lactone, non-alkylated or N—C$_1$–C$_4$-mono- or -dialkylated carboxylic acid amide having 2 to 20 C atoms or non-alkylated or N—C$_1$–C$_4$alkylated lactam; an open-chain or cyclic and aliphatic, araliphatic or aromatic, primary, secondary or tertiary amine having 1 to 20 C atoms; or a cyclopentadienyl chosen from the group consisting of cyclopentadienyl, indenyl and cyclopentadienyls or indenyls which contain one or more methyl groups or trimethylsilyl groups.

21. A process according to claim 20, wherein the non-photolabile ligand is methanol, ethanol, n- and i-propanol, n-, i- and t-butanol, 1,1,1-trifluoroethanol, bistrifluoromethylmethanol, tristrifluoromethylmethanol, pentanol, hexanol, methyl- or ethylmercaptan, cyclopentanol, cyclohexanol, cyclohexylmercaptan, phenol, methylphenol, fluorophenol, phenylmercaptan, benzylmercaptan, benzyl alcohol, diethyl ether, dimethyl ether, diisopropyl ether, di-n- or di-t-butyl ether, tetrahydrofuran, tetrahydropyran, dioxane, diethyl thioether, tetrahydrothiophene, dimethyl sulfoxide, diethyl sulfoxide, tetra- and pentamethylene sulfoxide, dimethyl sulfone, diethyl sulfone, tetra- and pentamethylene sulfone, acetone, methyl ethyl ketone, diethyl ketone, phenyl methyl ketone, methyl isobutyl ketone, benzyl methyl ketone, acetaldehyde, propionaldehyde, trifluoroacetaldehyde, benzaldehyde, ethyl acetate, butyrolactone, dimethylformamide, dimethylacetamide, pyrrolidone and N-methylpyrrolidone, indenyl, cyclopentadienyl, methyl- or dimethyl- or pentamethylcyclopentadienyl and trimethylsilylcyclopentadienyl.

22. A process according to claim 20, wherein the non-photolabile ligand is a primary amine of the formula R$_{24}$NH$_2$, secondary amine of the formula R$_{24}$R$_{25}$NH or tertiary amine of the formula R$_{26}$R$_{27}$R$_{28}$N, in which R$_{24}$ is C$_1$–C$_{18}$alkyl, C$_5$- or C$_6$cycloalkyl which is unsubstituted or substituted by C$_1$–C$_4$alkyl or C$_1$–C$_4$alkoxy, or C$_6$—Cl$_5$aryl or C$_7$–C$_{12}$aralkyl which is unsubstituted or substituted by C$_1$–C$_4$alkyl or C$_1$–C$_4$alkoxy, R$_{25}$ independently is as defined for R$_{24}$, or R$_{24}$ and R$_{25}$ together are tetramethylene, pentamethylene, 3-oxa-1,5-pentylene or —CH$_2$—CH$_2$—NH—CH$_2$—CH$_2$— or —CH$_2$—CH$_2$—N(C$_1$–C$_4$alkyl)—CH$_2$—CH$_2$—, R$_{26}$, R$_{27}$ and R$_2$8 independently of one another are as defined for R$_{24}$, or R$_{26}$ and R$_{27}$ together are as defined jointly for R$_{24}$ and R$_{25}$ and R$_{28}$ is as defined for R$_{24}$.

23. A process according to claim 22, wherein the amine is methyl-, dimethyl-, trimethyl-, ethyl-, diethyl-, triethyl-, methyl-ethyl-, dimethyl-ethyl, n-propyl-, di-n-propyl-, tri-n- butyl-, cyclohexyl-, phenyl- or benzylamine, or pyrrolidine, N-methylpyrrolidine, piperidine, piperazine, morpholine or N-methylmorpholine.

24. A process according to claim 20, wherein the non-photolabile ligand is $H_2O$, $NH_3$ or a fluorinated $C_1$–$C_4$alkanol.

25. A process according to claim 19, wherein the non-photolabile ligand is $H_2O$, $NH_3$, cyclopentadienyl, methanol or ethanol.

26. A process according to claim 1, wherein the ruthenium or osmium compound is one of the formula II

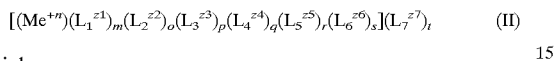  (II)

in which

Me is ruthenium or osmium;

n is, 1, 2, 3, 4, 5, 6, 7 or 8;

$L_1$ and $L_2$ are photolabile ligands bonded to the metal atom Me selected from the group consisting of monocyclic, polycyclic and fused arenes having 6 to 24 C-atoms; and $L_3$, $L_4$, $L_5$ and $L_6$ independently of one another are a non-photolabile or a photolabile ligand; or $L_1$ is a photolabile ligand bonded to the metal atom Me selected from the group consisting of nitrogen, monocyclic heteroarenes, fused heteroarenes and fused arene-heteroarenes having 3 to 22 C-atoms and 1 to 3 heteroatoms selected from the group consisting of O, S, and N; or $L_1$ is a photolabile ligand bonded to the metal atom Me selected from the group consisting of aliphatic, cycloaliphatic, aromatic and araliphatic nitriles; and $L_2$, $L_3$, $L_4$, $L_5$ and $L_6$ independently of one another are a non-photolabile ligand;

m is 1, 2, 3, 4, 5 or 6;

o, p, q, r, and s independently of one another are 0, 1, 2, 3, 4 or 5;

$z_1$, $z_2$, $z_3$, $z_4$, $z_5$, $z_6$ and $z_7$ independently of one another are $-4$, $-3$, $-2$, $-1$, $0$, $+1$ or $+2$; and $L_7$ is a non-coordinating cation or anion; and in which the sum of $m+o+p+q+r+s$ is an integer from 2 to 6, and t is the quotient of $(n+m\cdot z_1+o\cdot z_2+p\cdot z_3+q\cdot z_4+r\cdot z_5+s\cdot z_6)/z_7$.

27. A process according to claim 26, wherein, in formula II, $L_7$ is halogen, the anion of an oxygen acid, $BF_4$, $PF_6$, $SiF_6$ or $AsF_6$.

28. A process according to claim 27, wherein the anion of an oxygen acid is sulfate, phosphate, perchlorate, perbromate, periodate, antimonate, arsenate, nitrate, carbonate, formate, acetate, propionate, butyrate, benzoate, phenylacetate, mono-, di- or trichloro- or -fluoroacetate, methylsulfonate, ethylsulfonate, propylsulfonate, butylsulfonate, trifluoromethylsulfonate (triflate), tosylate, mesylate, brosylate, p-methoxy- or p-ethoxyphenylsulfonate, pentafluorophenylsulfonate or 2,4,6-triisopropylsulfonate, methylphosphonate, ethylphosphonate, propylphosphonate, butylphosphonate, phenylphosphonate, p-methylphenylphosphonate or benzylphosphonate.

29. A process according to claim 26, in which, in formula II, Me is $Ru^{2+}$.

30. A process according to claim 26, in which, in formula II, the ligands $L_1$, $L_2$, $L_3$, $L_4$, $L_5$ and $L_6$ independently of one another are selected from the group consisting of aliphatic, cycloaliphatic, aromatic or araliphatic nitriles having 1 to 22 C-atoms which are unsubstituted or substituted by a substituent selected from the group consisting Of $C_1$–$C_4$alkyl, $C_1$–$C_4$alkoxy, and halogen; or $L_1$, $L_2$ and $L_3$ together are selected from the group consisting of monocyclic, polycyclic or fused arenes having 6 to 24 C atoms which are unsubstituted or substituted by substituents selected from the group consisting of —OH, $C_1$–$C_4$alkyl, $C_1$–$C_4$alkoxy, $C_6$–$C_{12}$aryl and halogen, or monocyclic heteroarenes, fused heteroarenes and fused arene-heteroarenes having 3 to 22 C atoms and 1 to 3 heteroatoms chosen from the group consisting of O, S and N, which are unsubstituted or substituted by substituents selected from the group consisting of —OH, $C_1$–$C_4$alkyl, $C_1$–$C_4$alkoxy and halogen, and $L_4$, $L_5$ and $L_6$ together have the same meaning, or individually independently of one another are $N_2$ or the said nitrile.

31. A process according to claim 26, wherein, in formula II, the ligands $L_1$, $L_2$, $L_3$, $L_4$, $L_5$ and $L_6$ independently of one another are $N_2$, $C_1$–$C_{20}$alkylnitrile, $C_6$–$C_{12}$arylnitrile, $C_7$–$C_{12}$aralkylnitrile, or $L_1$, $L_2$ and $L_3$ in each case together are the groups $A_1$ or $A_2$ and $L_4$, $L_5$ and $L_6$ likewise together have this meaning or in each case individually are $N_2$, or the said nitriles,

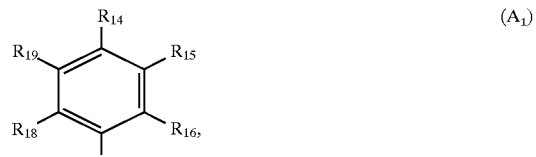

in which $R_{14}$, $R_{15}$, $R_{16}$, $R_{17}$, $R_{18}$, $R_{19}$, $R_{20}$, $R_{21}$, $R_{22}$ and $R_{23}$ independently of one another are hydrogen, $C_1$–$C_{20}$alkyl $C_1$–$C_{20}$alkoxy, aryl or $SiR_{37}R_{38}R_{39}$, and wherein, in the case of groups $A_1$ and $A_2$, an aromatic or heteroaromatic ring, the heteroatoms of which are chosen from the group consisting of oxygen, sulfur and nitrogen, can be fused onto adjacent carbon atoms; and $R_{37}$, $R_{38}$ and $R_{39}$ independently of one another are $C_1$–$C_{12}$alkyl, phenyl or benzyl.

32. A process according to claim 31, wherein, in formula II, $L_1$, $L_2$, $L_3$, $L_4$, $L_5$ and $L_6$ independently of one another are $C_1$–$C_{12}$alkylnitrile or $C_6$–$C_{12}$arylnitrile or $L_1$, $L_2$ and $L_3$ taken together are the groups $A_1$ or $A_2$ and $L_4$, $L_5$ and $L_6$ likewise together have this meaning or in each case independently are $N_2$ or the said nitriles in which $R_{14}$, $R_{15}$, $R_{16}$, $R_{17}$, $R_{18}$, $R_{19}$, $R_{20}$, $R_{21}$, $R_{22}$ and $R_{23}$ independently of one another are hydrogen, $C_1$–$C_6$alkyl, $C_1$–$C_6$alkoxy, $SiR_{37}R_{38}R_{39}$ or phenyl, and in which, in the case of the groups $A_1$ and $A_2$, a benzene ring can be fused onto adjacent carbon atoms, and $R_{37}$, $R_{38}$ and $R_{39}$ are methyl, ethyl or phenyl.

33. A process according to claim 31, wherein, in formula II, $L_1$, $L_2$, $L_3$, $L_4$, $L_5$ and $L_6$ independently of one another are methylnitrile, ethylnitrile or phenylnitrile, or $L_1$, $L_2$ and $L_3$ in each case together are the groups $A_1$ or $A_2$ and $L_4$, $L_5$ and $L_6$ likewise together have this meaning or in each case individually are the said nitriles, in which $R_{14}$, $R_{15}$, $R_{16}$, $R_{17}$, $R_{18}$, $R_{19}$, $R_{20}$, $R_{21}$, $R_{22}$ and $R_{23}$ independently of one another are hydrogen, methyl, methoxy or phenyl, and in which, in the case of the groups $A_1$ and $A_2$, a benzene ring can be fused onto adjacent carbon atoms.

34. A process according to claim 26, wherein, in formula II, $L_1$, $L_2$ and $L_3$ taken together are monocyclic, polycyclic or fused arenes having 6 to 24 C atoms which are unsubstituted or substituted by $C_1$–$C_4$alkyl, $C_1$–$C_4$alkoxy, $C_6$–$C_{12}$aryl or halogen, or monocyclic heteroarenes, fused heteroarenes or fused arene-heteroarenes having 4 to 22 C atoms and 1 to 3 heteroatoms chosen from the group consisting of O, S and N, which are unsubstituted or substituted by $C_1$–$C_4$alkyl, $C_1$–$C_4$alkoxy or halogen, and $L_4$, $L_5$ and $L_6$ are a non-photolabile ligand.

35. A process according to claim 34, wherein, $L_1$, $L_2$ and $L_3$ are benzene or naphthalene, and the non-photolabile ligand is $H_2O$, $NH_3$, unsubstituted or fluorine-substituted $C_1$–$C_4$alkanol or -alkanethiol, an aliphatic ether, thioether, sulfoxide or sulfone having 2 to 8 C atoms, dimethylformamide or N-methylpyrrolidone.

36. A process according to claim 26, wherein $L_1$ is $N_2$ or a $C_1$–$C_4$alkylnitrile, benzonitrile, benzylnitrile, $NH_3$ or an amine having 1 to 12 C atoms, $Y_1$ is a non-coordinating anion and x is the number 1 or 2.

37. A process according to claim 1, wherein the process is carried out in presence of a solvent selected from the group consisting of tetrahydrofuran, dioxane, acetone, water, an alcohol, methylene chloride and chloroform.

38. A process according to claim 1, wherein the reaction temperature is from −20° to +110° C.

39. A process according to claim 1, wherein the mixture of monomer and ruthenium or osmium compound is irradiated in solution, at least one monomer is then added and the mixture is irradiated further.

40. A process according to claim 1, wherein the ruthenium or osmium compound is used in an amount of 0.001 to 20 mol %, based on the amount of monomer.

41. A process according to claim 1, wherein heating in process stage b) is a reaction temperature of 50° to 200° C.

42. A process according to claim 1, wherein the ruthenium or osmium compound is activated by irradiation in solution, at least one monomer is then added, and the mixture is irradiated further.

43. A process according to claim 1, wherein the ruthenium or osmium compound is selected from the group consisting of $Ru(CH_3CN)_6(tos)_2$, $Ru(CH_3CH_2CN)_6(tos)_2$, $Ru(CH_3CN)_6 (CF_3SO_3)_2$, $Ru(CH_3CH_2CN)_6(CF_3SO_3)_2$, $Ru(C_5H_6)_2(tos)_2$, $[Ru(C_6H_6)(C_6H_5OCH_3)_3(BF_4)_2$, $[Ru(C_6H_6)(C_6H_5i$-propyl$)](BF_4)_2$, $[RU(C_6H_6)(1,3,5$-trimethylphenol$)](BF_4)_2$, $[Ru(C_6H_6)(hexamethylbenzene)](BF4)_2$, $[Ru(C_6He)(biphenyl)](BF_4)_2$, $[Ru(C_6H_6)(chrysene)] (BF4)_2$, $[Ru(C_6H_6)(naphthalene)](BF4)_2$, $[Ru(cyanophenyl)_6](tos)z$, $[Ru(cyanophenyl)_6](CF_3SO_3)_2$, $[Ru(C_6H_6)(tetramethylthiophene)_3](tos)_2$, $[Ru(C_6H_6)(tetramethylthiophene)a](CF_3SO_3)2$, $(Os(NH_3)5N_2](PF_8)_2$, $[Ru(NH_3)_5N_2](PF_6)_2$, $[Ru(N H_3)_5(CH_3CN)]BF_4$, and $[Ru(C_6H_6(tetrahydrothiophene)3](CF3SO_3)2$ and tos is p-toluolsulfonate.

44. A composition comprising a cyclic olefin or at least two different cyclic olefins and a catalytically active amount of a heat-stable ruthenium or osmium compound i) wherein at least two photolabile ligands are bonded to one metal atom and are selected from the group consisting of monocyclic, polycyclic and fused arenes having 6 to 24 C-atoms which are unsubstituted or substituted by substituents selected from the group consisting of OH, $C_1$–$C_4$-alkyl, $C_1$–$C_4$-alkoxy, $C_6$–$C_{12}$-aryl and halogen; or ii) wherein one or more photolabile ligands are bonded to one metal atom and are selected from the group consisting of nitrogen, monocyclic heteroarenes, fused heteroarenes and fused arene-heteroarenes having 3 to 22 C-atoms and 1 to 3 heteroatoms selected from the group consisting of O, S, and N, which are unsubstituted or substituted by substituents selected from the group consisting of $C_1$–$C_4$-alkyl, $C_1$–$C_4$-alkoxy and halogen; or iii) wherein one or more photolabile ligands are bonded to one metal atom and are selected from the group consisting of aliphatic, cycloaliphatic, aromatic and araliphatic nitriles which are unsubstituted or substituted by substituents selected from the group consisting of $C_1$–$C_4$-alkyl, $C_3$–$C_4$-alkoxy and halogen;

subject to the proviso that none of the photolabile ligands from the group i) are present in the catalyst together with photolabile ligands either from the group ii) or the group iii);

which ligands are photolabile by exposure of the compound to a light source radiating in the range selected from the ultraviolet, visible and infrared range; and then mixing with at least one olefin the remaining coordination sites being occupied by non-photolabile ligands.

* * * * *